US010611576B2

(12) United States Patent
Herring, II et al.

(10) Patent No.: US 10,611,576 B2
(45) Date of Patent: Apr. 7, 2020

(54) CHAIN DISK CORNER

(71) Applicant: Hog Slat, Inc., Newton Grove, NC (US)

(72) Inventors: William Thomas Herring, II, Newton Grove, NC (US); Timothy Alan Hawkins, Stedman, NC (US); Marcel Joern Alfred Schubert, Raleigh, NC (US)

(73) Assignee: HOG SLAT, INC., Newton Grove, NC (US)

( * ) Notice: Subject to any disclaimer, the term of this patent is extended or adjusted under 35 U.S.C. 154(b) by 0 days.

(21) Appl. No.: 16/047,898

(22) Filed: Jul. 27, 2018

(65) Prior Publication Data

US 2020/0031583 A1 Jan. 30, 2020

(51) Int. Cl.
*B65G 23/04* (2006.01)
*B65G 23/02* (2006.01)
*B65G 23/00* (2006.01)
*A01K 5/02* (2006.01)

(52) U.S. Cl.
CPC ............ *B65G 23/02* (2013.01); *A01K 5/0208* (2013.01)

(58) Field of Classification Search
None
See application file for complete search history.

(56) References Cited

U.S. PATENT DOCUMENTS

| 2,868,351 A | 1/1959 | Hegmann |
| 3,097,735 A | 7/1963 | Siciliano |
| 3,105,590 A | 10/1963 | Polley |

(Continued)

FOREIGN PATENT DOCUMENTS

| CN | 202765828 U | 3/2013 |
| CN | 204888343 U | 12/2015 |

(Continued)

OTHER PUBLICATIONS

Author Unknown, "90 Corner Chain Feeder," Product Information Sheet, www.hogslat.com/cumberland-90-corner, accessed on May 9, 2017, Hog Slat, 3 pages.

(Continued)

*Primary Examiner* — Kavel Singh
(74) *Attorney, Agent, or Firm* — Withrow & Terranova, PLLC

(57) ABSTRACT

Disclosed is a chain disk corner. In certain embodiments, the chain disk corner includes a bi-directional orientation independent chain disk corner wheel. In particular, the wheel is molded and devoid of moving parts. In certain embodiments, the chain disk corner includes a window portion. In particular, a bottom housing subassembly includes a bottom body of an opaque material and a hingedly attached window portion. In certain embodiments, the chain disk corner includes a reinforcing washer. In particular, a top washer is attached by injection molding to an interior of the top body, and/or a bottom washer is attached by injection molding to an interior of the bottom body. In certain embodiments, the chain disk corner includes a top surface devoid of pockets. In particular, a top body includes a plurality of ribs positioned at an interior surface of the top body.

40 Claims, 31 Drawing Sheets

(56) References Cited

U.S. PATENT DOCUMENTS

| | | | | |
|---|---|---|---|---|
| 3,147,853 | A | * | 9/1964 | Huis .................... A01K 39/01 198/729 |
| 3,157,273 | A | | 11/1964 | Robinson, Jr. et al. |
| 3,250,250 | A | | 5/1966 | Woock |
| 4,166,581 | A | | 9/1979 | Hetrick |
| 4,327,828 | A | * | 5/1982 | Williams ............... B65G 19/22 119/57.2 |
| 4,471,868 | A | | 9/1984 | Buschbom et al. |
| 6,233,843 | B1 | | 5/2001 | McKenzie et al. |
| 7,918,330 | B2 | * | 4/2011 | Bertolini ............... B65G 19/24 198/716 |
| 8,245,837 | B2 | | 8/2012 | Eversole |
| 8,418,837 | B2 | | 4/2013 | Eversole |
| 2010/0187073 | A1 | | 7/2010 | Eversole |
| 2019/0084770 | A1 | * | 3/2019 | Kowalski ............... B65G 23/04 |

FOREIGN PATENT DOCUMENTS

| | | | |
|---|---|---|---|
| DE | 1193423 | B | 5/1965 |
| DE | 202012007661 | U1 | 8/2012 |
| ES | 293385 | A1 | 4/1964 |
| GB | 2187426 | A | 9/1987 |
| KR | 20020001484 | A | 1/2002 |

OTHER PUBLICATIONS

Author Unknown, "Auto Pan Disc Chain Feeding System for Breeder," Product Information Sheet, www.farmingmachinechina.com/4-5-disc-chain-feeding-system.html, accessed May 9, 2017, 2 pages.

Author Unknown, "Chain Feeding System: Feed Hopper," Product Information Sheet, tarimar.az/english/chaifeeding.html, accessed on May 9, 2017, Tarimar Distribution LLC, 1 page.

Author Unknown, "Chain & Disc—Corner 50MM," Product Information Sheet, 2014, Dalein Plaasbou, 2 pages.

Author Unknown, "Chain Disk," Product Information Sheet, www.automatedproduction.com/en/apchaindisk.php, accessed May 2, 2017, AGCO Corporation, 2 pages.

Author Unknown, "Chain disk for automatic pig feeding systems chaindic pig feed equipment," Model PNH122, Product Information, www.alibaba.com/product-detail/chain-disk-for-automatic-pig-feeding_60303894013.html, accessed May 2, 2017, North Husbandry, 5 pages.

Author Unknown, "Disc Feed Delivery System: Closed Loop Disc Feed Transport System," Product Information Sheet, www.choretimehog.com/products.php?product_id=464, accessed May 9, 2017, PigTek Pig Equipment System, CTB, Inc., 2 pages.

Author Unknown, "WL10222094: Grow-Disk 90 Chain Disk Corner," Product Information Sheet, www.hogslat.com/grow-disk-90-degree-blue-corner-with-cast-iron-wheel, May 9, 2017, Hog Slat, 3 pages.

Author Unknown, "Flex-Flo Specifications," Product Information Sheet, 2017, John Emewein Ltd, 8 pages.

Author Unknown, "Chain-disc feeding system for pigs," Product Information Sheet, www.weiku.com/products-image/14320450/chain-disc-feeding-system-for-pigs.html, 2011, Weiku.com, 4 pages.

Author Unknown, "DiScaflex," Product Information Sheet, www.roxell.com/en/solutions/Sows/In_group/Discaflex, 2010, Roxell, 2 pages.

Extended European Search Report for European Patent Application No. 18207627.3, dated May 23, 2019, 10 pages.

Extended European Search Report for European Patent Application No. 18207638.0, dated May 23, 2019, 10 pages.

* cited by examiner

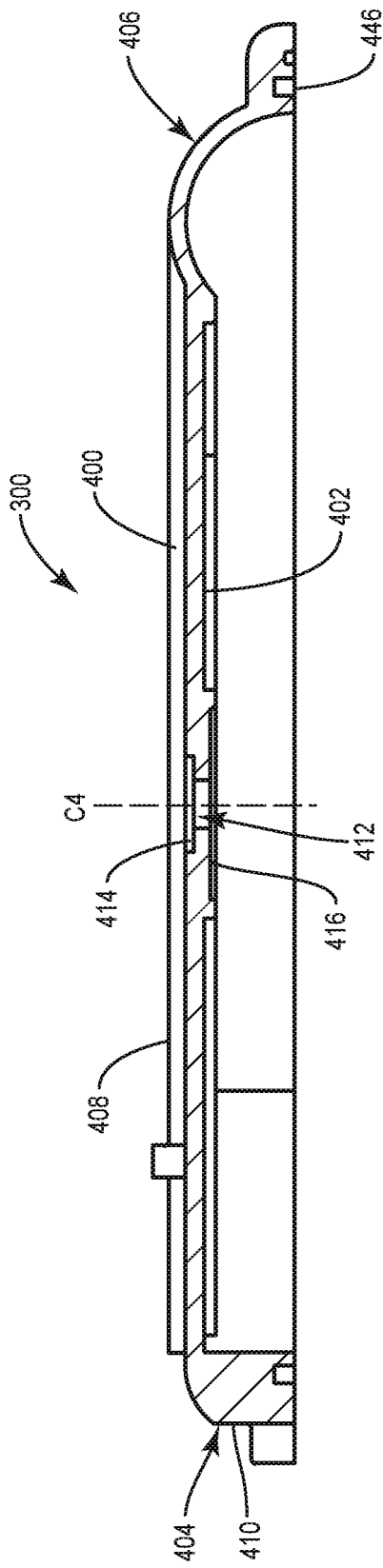
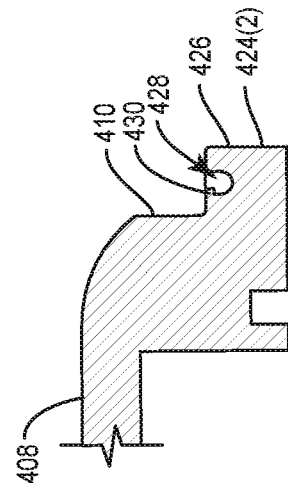
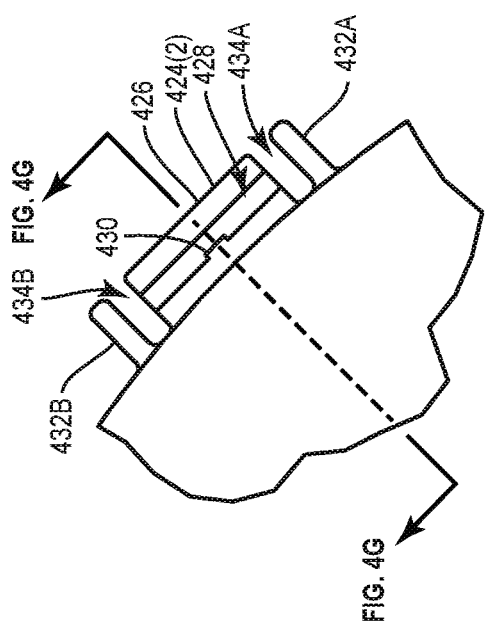
FIG. 4E
FIG. 4G
FIG. 4F

CHAIN DISK CORNER

FIELD OF THE DISCLOSURE

The disclosure relates to a feed delivery system, and more particularly to a chain disk corner for a feed delivery system.

BACKGROUND

Livestock feed systems allow for large scale, simultaneous delivery of livestock feed from a central storage container to multiple animals, which may be housed in separate enclosures and buildings at a farm or other livestock management facility. Some systems use a chain disk conveyor to move feed along a feed path toward one or more outlets. Some feed paths are formed by a plurality of tubes and corner housings. A chain with a plurality of disks positioned generally perpendicularly thereon is placed within the feed path. As the chain and corresponding disks move through the tubes and corner housings, the disks on the chain push feed from the central storage container (or feed hopper) through the feed path. An advantage of chain disk conveyors is that they provide an enclosed system that can operate at various angles and various planes.

FIG. 1 is a perspective view of a feed system 100 including a plurality of chain disk corners 102. In particular, the feed system 100 includes one or more feed hoppers 104, tubing 106 (may also be referred to as a chain disk line, chain disk tubing, etc.), chain disk corners 102, and a plurality of feed drops 108 (may also be referred to as feed outlets). The feed hoppers 104 house feed (or other particulate) in bulk. The feed hoppers 104 may deliver feed by gravity to the tubing 106 at a bottom of the feed hopper 104. The tubing 106 and chain disk corners 102 form a feed path for delivering the feed from the feed hopper 104 to the various feed drops 108. However, corner housings 102 used in these chain disk conveyor systems suffer from a number of deficiencies.

Some corner housings 102 are entirely opaque, which prevents viewing the interior of the housing, such as to inspect any potential problems and/or confirm proper operation of the wheel within the housing. While some corner housings 102 may be entirely transparent, such corner housings 102 are typically prone to cracking and breaking, as the transparent material (e.g., transparent plastic material) tends to be weaker and less robust than the opaque materials (e.g., opaque plastic material), as transparent materials may be limited to certain resins. Further, some corner housings 102 are of a clamshell configuration, such that accessing the interior of the housing may be time consuming and difficult. For example, opening the corner housing 102 may require removing the corner housing 102 from the feed path to remove the top half of the housing from the bottom half of the housing. Often, the wheel assembly is mounted to the top half and/or bottom half of the housing, which may further complicate this process.

Some corner housings 102 include radially extending ribs on the exterior of the housing to provide structural support and rigidity to the housing. These ribs are typically on the exterior of the housing for ease of manufacturing (e.g., mold construction). However, external ribs may form pockets on the top half of the housing, which may collect dust, dirt, water, and/or other particulate. Such accumulation is generally undesirable and may even affect proper operation of the corner housing 102, such as by pooling next to the axle, seeping into the housing, and/or interfering with operation of the wheel.

The wheel assembly may be mounted at a seat within the housing. Load and operation of the wheel assembly within the housing may deflect and increase structural stress at the mounting point of the housing. This may lead to cracking, breaking, or other structural damage to the corner housing 102.

Some corner housings 102 include a self-cleaning wheel which may be configured to redirect any feed that has accumulated within the housing back into the feed path. However, some self-cleaning wheels include moving parts, operation of which may be negatively affected by accumulation of feed particulate within those moving parts. Some self-cleaning wheels may be orientation dependent, where the self-cleaning wheel has a designated top and bottom, and cannot function properly if positioned upside down. Further, some self-cleaning wheels may be directionally dependent, where the wheel cannot self-clean clockwise and counterclockwise. Such limitations hinder installation, maintenance, and repair of corner housings.

No admission is made that any reference cited herein constitutes prior art. Applicant expressly reserves the right to challenge the accuracy and pertinency of any cited documents.

SUMMARY

Disclosed is a bi-directional orientation independent chain disk corner wheel. In particular, the wheel is molded and devoid of moving parts. The wheel relies on the geometry thereof to create a sweep path to direct feed grain or other material from an interior of the wheel to an exterior of the wheel. The wheel can self-clean regardless of whether the wheel is rotated in a clockwise direction or a counterclockwise direction. Further, the wheel can self-clean regardless of whether the wheel is in an upright orientation or an inverted orientation. Accordingly, the wheel and corresponding chain disk corner are easier to assemble, install, repair, and maintain.

Disclosed is a chain disk corner with a window portion. In particular, the chain disk corner includes a bottom housing subassembly that includes a bottom body of an opaque material and a window portion of a translucent material that is hingedly attached to the bottom body. By forming only a portion of the bottom body out of the translucent material, the chain disk corner maintains robustness and strength while still providing visual access to an interior of the chain disk housing during operation of the chain disk housing. Further, the window provides selective access to an interior of the housing, even during operation of the chain disk housing.

Disclosed is a chain disk corner housing with a reinforcing washer. In particular, a top body of the chain disk corner housing includes a top washer attached by injection molding to an interior of the top body, and/or a bottom body of the chain disk corner housing includes a bottom washer attached by injection molding to an interior of the bottom body. The top body and the bottom body are made of plastic and the top washer and bottom washer are made of metal, which is stronger and more rigid than plastic (although heavier and more expensive). In this way, the top washer and the bottom washer increase the strength and rigidity at the point of attachment of a wheel assembly within the chain disk corner housing.

Disclosed is a chain disk corner with a top surface devoid of pockets. In particular, a top body of a chain disk corner housing includes a plurality of ribs positioned at an interior surface of the top body. In this way, the chain disk corner maintains robustness and strength, but avoids any material accumulation, such as particulate, feed, or water, on top of the chain disk corner housing.

One embodiment is directed to a wheel for a chain disk corner comprising a central hub, a rim, and a plurality of spokes. The central hub extends along a center axis. The central hub defines a central hole to receive an axle therethrough to rotatably mount the wheel within the chain disk corner. The rim has a circular sidewall to route a disk chain through the chain disk corner. The circular sidewall has a top edge and a bottom edge opposite the top edge. A portion of the bottom edge is recessed to define at least one bottom passage in the circular sidewall. A plurality of spokes is circumferentially positioned around the central hub. Each of the plurality of spokes has an inner end connected to the central hub and an outer end connected to the rim. At least one of the plurality of spokes defines a first upright sweeping surface and a second upright sweeping surface opposite the first upright sweeping surface. The first upright sweeping surface and the second upright sweeping surface are configured to contact material accumulated within the wheel at a bottom inner surface of the chain disk corner when the wheel is in an upright configuration. The first upright sweeping surface is configured to direct the material through the at least one bottom passage outside the wheel as the wheel rotates in a clockwise direction. The second upright sweeping surface is configured to direct the material through the at least one bottom passage outside the wheel as the wheel rotates in a counter-clockwise direction.

Another embodiment is directed to a wheel for a chain disk corner comprising a central hub, a rim, and a plurality of spokes. The central hub extends along a center axis. The central hub defines a central hole to receive an axle therethrough to rotatably mount the wheel to the chain disk corner. The rim has a circular sidewall to route a disk chain through the chain disk corner. The plurality of spokes is circumferentially positioned around the central hub. Each of the plurality of spokes has a proximal end connected to the central hub and a second end connected to the rim. The wheel is devoid of moving parts. The wheel is configured for bi-directional self-cleaning by rotation around a central axis of the wheel.

One embodiment is directed to a chain disk corner comprising a chain disk corner housing and a wheel. The chain disk corner housing comprises a top body, a bottom body, and a window. The top body comprises a top wheel portion and a top channel proximate the top wheel portion. The bottom body is attached to the top body. The bottom body comprises an opaque material. The bottom body comprises a bottom wheel portion and a bottom channel proximate the bottom wheel portion. The bottom channel and the top channel together define an angled channel for routing a disk chain therethrough. The window is attached to the bottom body. The window comprises a translucent material to provide visual access to an interior of the chain disk corner housing. The wheel is rotatably mounted to and positioned within the top wheel portion and the bottom wheel portion to route the disk chain through the angled channel. The top wheel portion is complementary in size and shape to a combination of (i) the bottom wheel portion of the bottom body and (ii) the window.

One embodiment is directed to a chain disk corner comprising a chain disk corner housing comprising a first body, a second body, a first washer, and a wheel. The first body comprises a first wheel portion and a first channel proximate the first wheel portion. The first body comprises a first material. The first wheel portion defines a first center hole.

The second body is attached to the first body. The second body comprises a second wheel portion and a second channel proximate the second wheel portion. The second body comprises the first material. The first channel and the second channel together define an angled channel for routing a disk chain therethrough. The first washer is non-rotatably attached to a first inner surface of the first wheel portion about the first center hole. The first washer comprises a second material having greater strength and rigidity than the first material. The first washer is configured to increase a strength and rigidity around the first center hole. The wheel is rotatably mounted and positioned within the first wheel portion and the second wheel portion to route the disk chain through the angled channel.

One embodiment is directed to a chain disk corner, comprising a chain disk corner housing comprising a top body. The top body comprises a top wheel portion to at least partially enclose and rotatably mount a wheel therein and a top channel proximate the top wheel portion to at least partially enclose a portion of a disk chain therein. The top wheel portion comprises a top surface devoid of pockets to prevent material accumulation on the top surface.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 4E is a cross-sectional side view of the top body of FIG. 4A;

FIG. 4F is an enlarged top view of a latch mount of the top body of FIG. 4A;

FIG. 4G is a cross-sectional side view of the latch mount of FIG. 4F;

DETAILED DESCRIPTION

Figure 1:
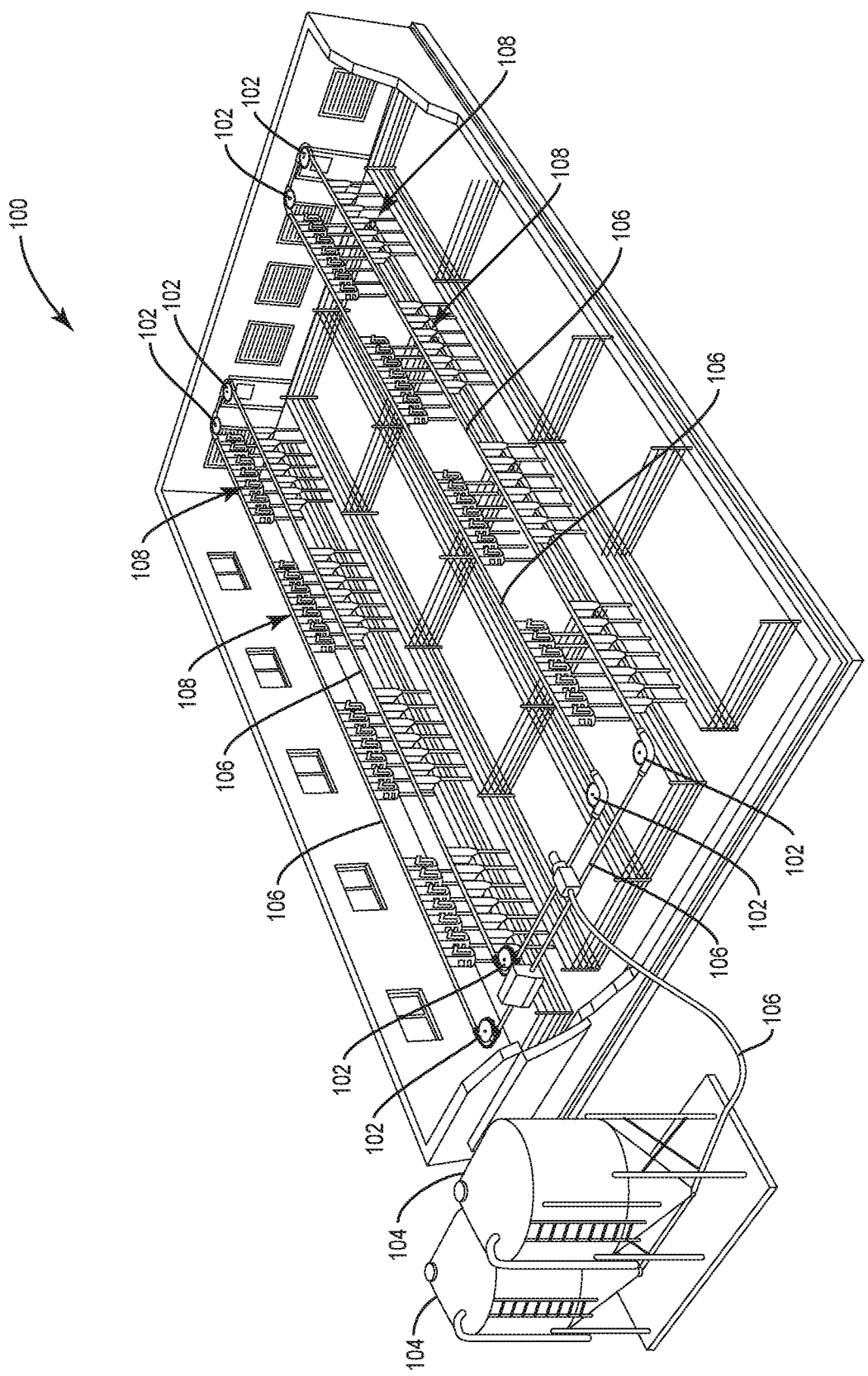
FIG. 1 is a perspective view of a feed system including a plurality of chain disk corners.

Reference will now be made in detail to the present preferred embodiments, examples of which are illustrated in the accompanying drawings. Whenever possible, the same reference numerals will be used throughout the drawings to refer to the same or like parts.

Terms such as "left," "right," "top," "bottom," "front," "back," "horizontal," "parallel," "perpendicular," "vertical," "lateral," "coplanar," and similar terms are used for convenience of describing the attached figures and are not intended to limit this description. For example, terms such as "left side" and "right side" are used with specific reference to the drawings as illustrated and the embodiments may be in other orientations in use. Further, as used herein, terms such as "horizontal," "parallel," "perpendicular," "vertical," "lateral," etc., include slight variations that may be present in working examples.

Disclosed is a bi-directional orientation independent chain disk corner wheel. In particular, the wheel is molded and devoid of moving parts. The wheel relies on the geometry thereof to create a sweep path to direct feed grain or other material from an interior of the wheel to an exterior of the wheel. The wheel can self-clean regardless of whether the wheel is rotated in a clockwise direction or a counter-clockwise direction. Further, the wheel can self-clean regardless of whether the wheel is in an upright orientation or an inverted orientation. Accordingly, the wheel and corresponding chain disk corner are easier to assemble, install, repair, and maintain.

Disclosed is a chain disk corner with a window portion. In particular, the chain disk corner includes a bottom housing subassembly that includes a bottom body of an opaque material and a window portion of a translucent material that is hingedly attached to the bottom body. By forming only a portion of the bottom body out of the translucent material, the chain disk corner maintains robustness and strength while still providing visual access to an interior of the chain disk housing during operation of the chain disk housing. Further, the window provides selective access to an interior of the housing, even during operation of the chain disk housing.

Disclosed is a chain disk corner housing with a reinforcing washer. In particular, a top body of the chain disk corner housing includes a top washer attached by injection molding to an interior of the top body, and/or a bottom body of the chain disk corner housing includes a bottom washer attached by injection molding to an interior of the bottom body. The top body and the bottom body are made of plastic and the top washer and bottom washer are made of metal, which is stronger and more rigid than plastic (although heavier and more expensive). In this way, the top washer and the bottom washer increase the strength and rigidity at the point of attachment of a wheel assembly within the chain disk corner housing.

Disclosed is a chain disk corner with a top surface devoid of pockets. In particular, a top body of a chain disk corner housing includes a plurality of ribs positioned at an interior surface of the top body. In this way, the chain disk corner maintains robustness and strength, but avoids any material accumulation, such as particulate, feed, or water, on top of the chain disk corner housing.

Figure 2A:
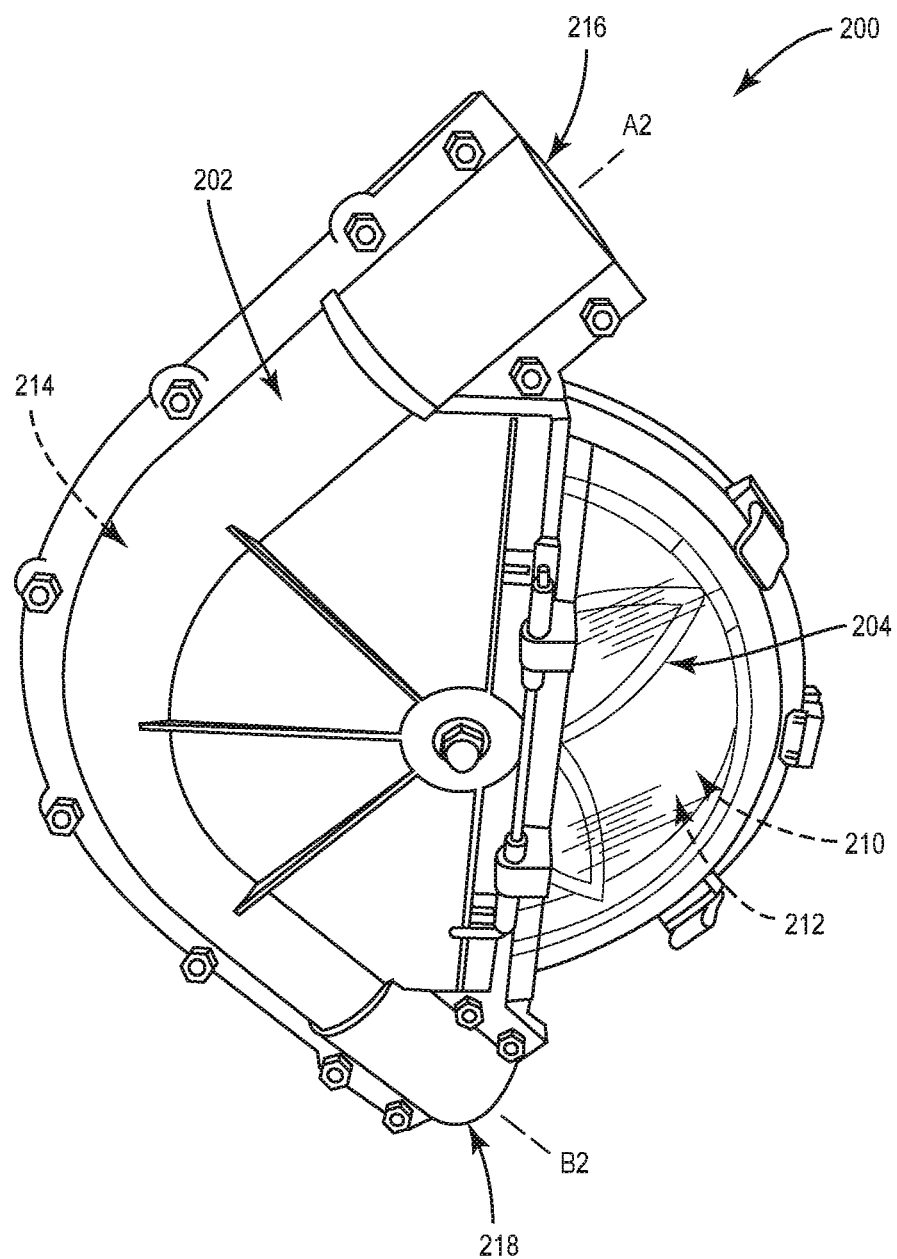
FIG. 2A is a bottom perspective assembled view of a chain disk corner according to one embodiment.
Figure 2B:
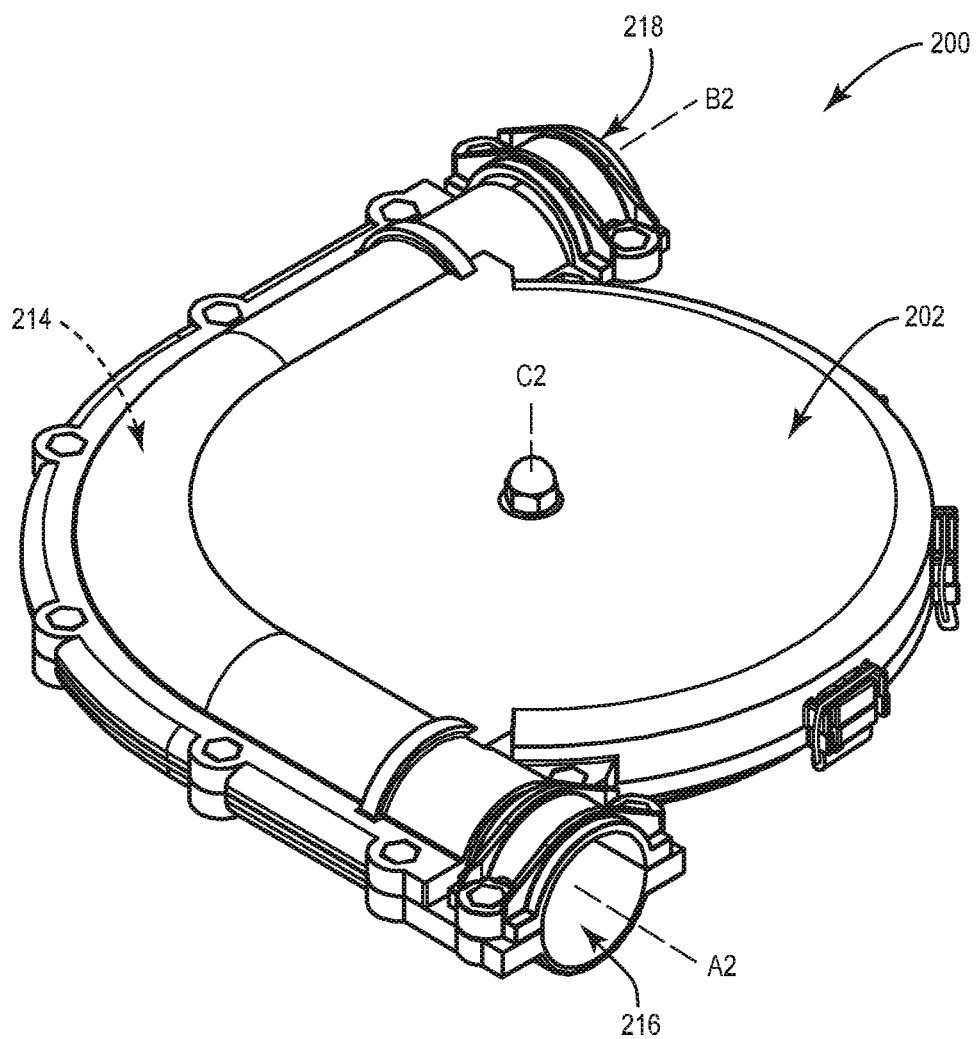
FIG. 2B is a top perspective assembled view of the chain disk corner of FIG. 2A.
Figure 2C:
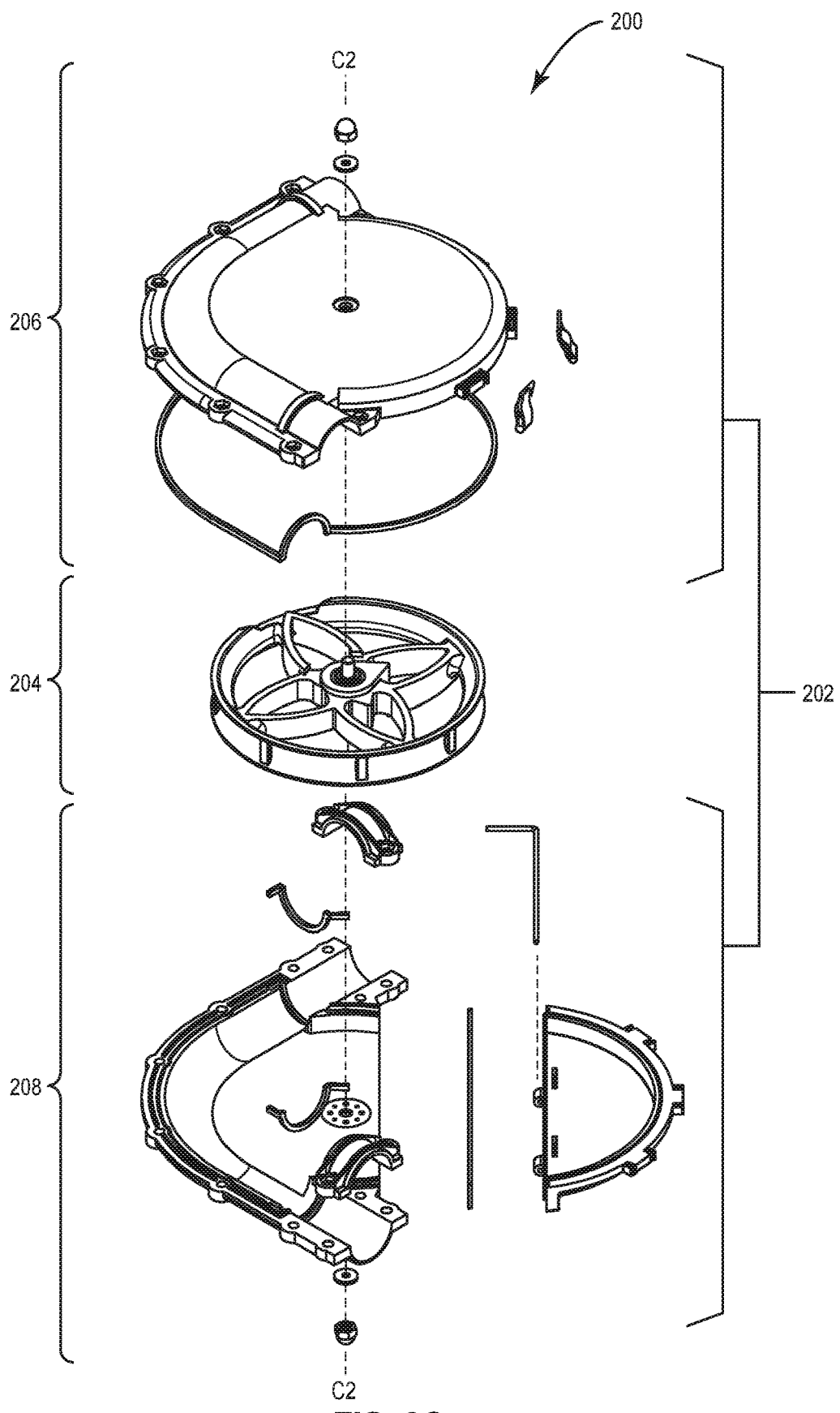
FIG. 2C is an exploded top perspective view of the chain disk corner of FIG. 2A, including a housing and a wheel assembly contained within the housing.

FIGS. 2A-2C are views of a chain disk corner 200 according to one embodiment. The chain disk corner 200 (may also be referred to as a chain disk corner, corner wheel unit, etc.) includes a housing 202 (may also be referred to as housing assembly, etc.) with a wheel assembly 204 positioned therein. The housing 202 includes a housing top subassembly 206 (may also be referred to as a housing top, top subassembly, top half, etc.) and a housing bottom subassembly 208 (may also be referred to as a housing bottom, bottom subassembly, bottom half, etc.) defining an interior 210. In particular, the wheel assembly 204 is positioned between and contained within the housing top subassembly 206 and the housing bottom subassembly 208.

The interior 210 formed by the top housing subassembly 206 and the bottom housing subassembly 208 includes a wheel cavity 212 for housing the wheel assembly 204 and an angled channel 214 (may also be referred to as a feed channel, etc.) proximate the wheel cavity 212 for containing the disk chain. The angled channel 214 directs the disk chain positioned within the angled channel 214 as the disk chain moves through the angled channel 214. The angled channel 214 includes a first opening 216 (e.g., an inlet) defining a first axis A2 at a first end of the angled channel 214 and a second opening 218 (e.g., an outlet) defining a second axis B2 at a second end of the angled channel 214. The first opening 216 (and first axis A2) is positioned 90 degrees from the second opening 218 (and second axis B2) about a central axis C2. In this way, a disk chain may be positioned within and fed through the first opening 216 through the angled channel 214 and through the second opening 218. Accordingly, the chain disk corner 200 redirects the disk chain and corresponding feed path by 90 degrees. The wheel assembly 204 is positioned within the wheel cavity 212 and mounted to the housing 202 to freely rotate therein. The wheel assembly 204 keeps the feed within the angled channel 214, keeps the disk chain taught, and freely rotates with the disk chain to route the disk chain through the angled channel 214 (as the disk chain is pulled through the angled channel 214).

Figure 3:
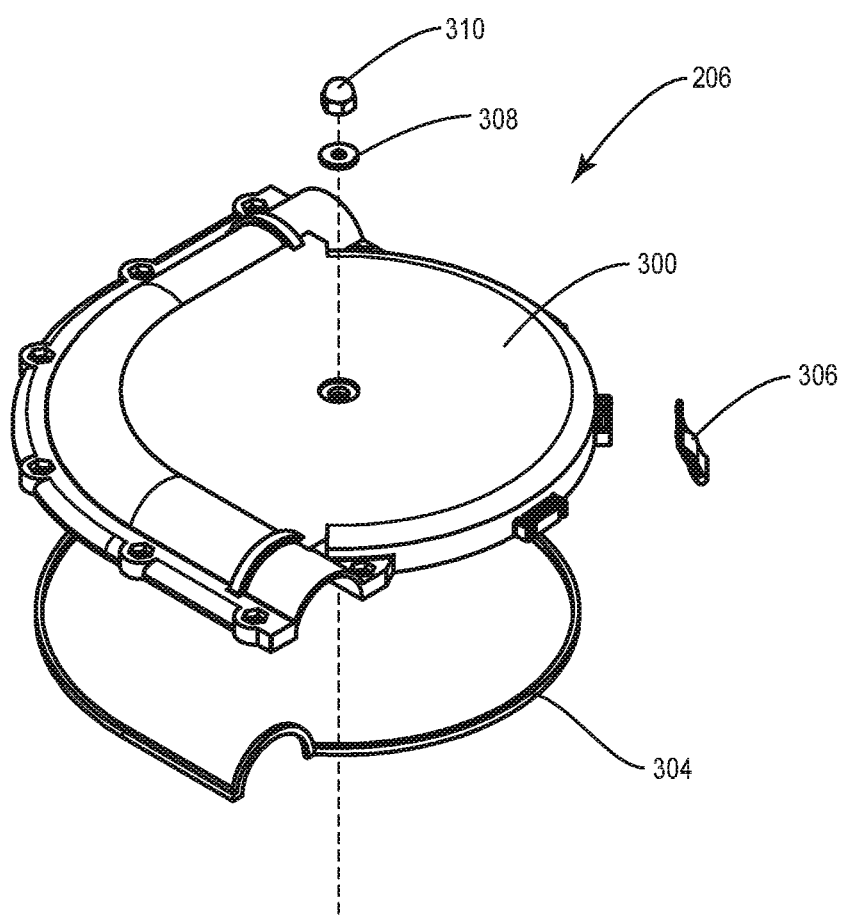
FIG. 3 is an exploded top perspective view of the housing top subassembly of FIGS. 2A-2C.

FIG. 3 is an exploded top perspective view of the housing top subassembly 206 of FIGS. 2A-2C. The housing top subassembly 206 includes a top body 300, a top reinforcing washer 302 (may also be referred to as a stiffening washer) (see FIGS. 4C-4D) to increase the structural strength and rigidity where the wheel assembly 204 mounts to the top body 300, a housing gasket 304 attached to the top body 300 to form a seal with the housing bottom subassembly 206B, and a plurality of retainer clips 306 (may also be referred to as latches) to releasably engage the bottom subassembly 208 and provide tool-less entry to the interior 210 of the chain disk corner 200. The housing top subassembly 206 further includes a top washer 308 and a top nut 310 to engage the wheel assembly 204, thereby mounting the wheel assembly 204 to the top body 300 of the housing top subassembly 206.

FIGS. 4A-4G are views of the top body 300 of the housing top subassembly 206 of FIG. 3. Referring to FIGS. 4A-4E, the top body 300 includes a top surface 400 (may also be referred to as an exterior surface) and an interior surface 402 (may also be referred to as a bottom surface) opposite to the top surface 400. The top body 300 further includes a wheel portion 404 which partially defines the wheel cavity 212 (see FIGS. 2A-2C) and a channel portion 406 proximate the wheel portion 404 which partially defines the angled channel 214 (see FIGS. 2A-2C).

The wheel portion 404 includes a top wall 408 with a peripheral wall 410 extending at least partially around the top wall 408. In particular, the top wall 408 is surrounded by a combination of the channel portion 406 and the peripheral wall 410. Further, the top wall 408 defines a top center hole 412 extending through the top wall 408 from the top surface 400 to the interior surface 402. The top surface defines an external seat 414 surrounding the top center hole 412 to receive the top washer 308, which facilitates assembly as the external seat 414 aligns the top washer 308 with an axis A4 of the top center hole 412. The top surface 400 of the top wall 408 of the wheel portion 404 is generally smooth and includes no pockets where water or particulate can accumulate. In other words, the top surface 400 of the top wall 408 is devoid of pockets to prevent material accumulation on the top surface 400.

Instead, the water runs off the top surface 400. It is noted that the top surface does not include radially extending ribs, where, for example, water can accumulate between adjacent radially extending ribs and the channel portion 406. However, it is further noted that some recesses, ribs, or other protrusions could be positioned on the top surface 400 as long as such recesses, ribs, or other protrusions do not form pockets where water or particulate can accumulate.

Figure 4A:
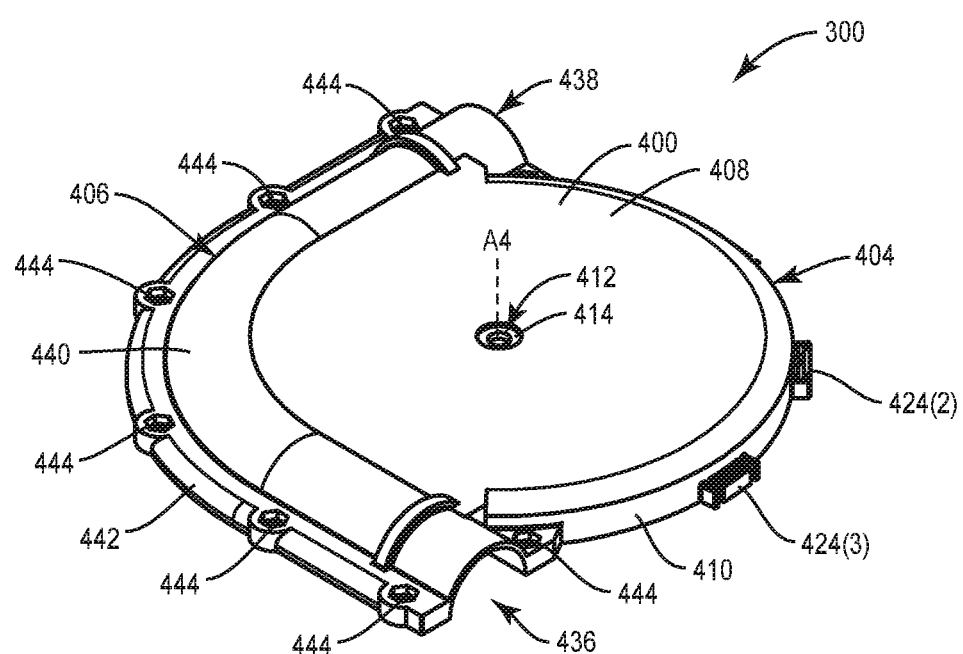
FIG. 4A is a top perspective view of a top body of the housing top subassembly of FIG. 3.
Figure 4B:
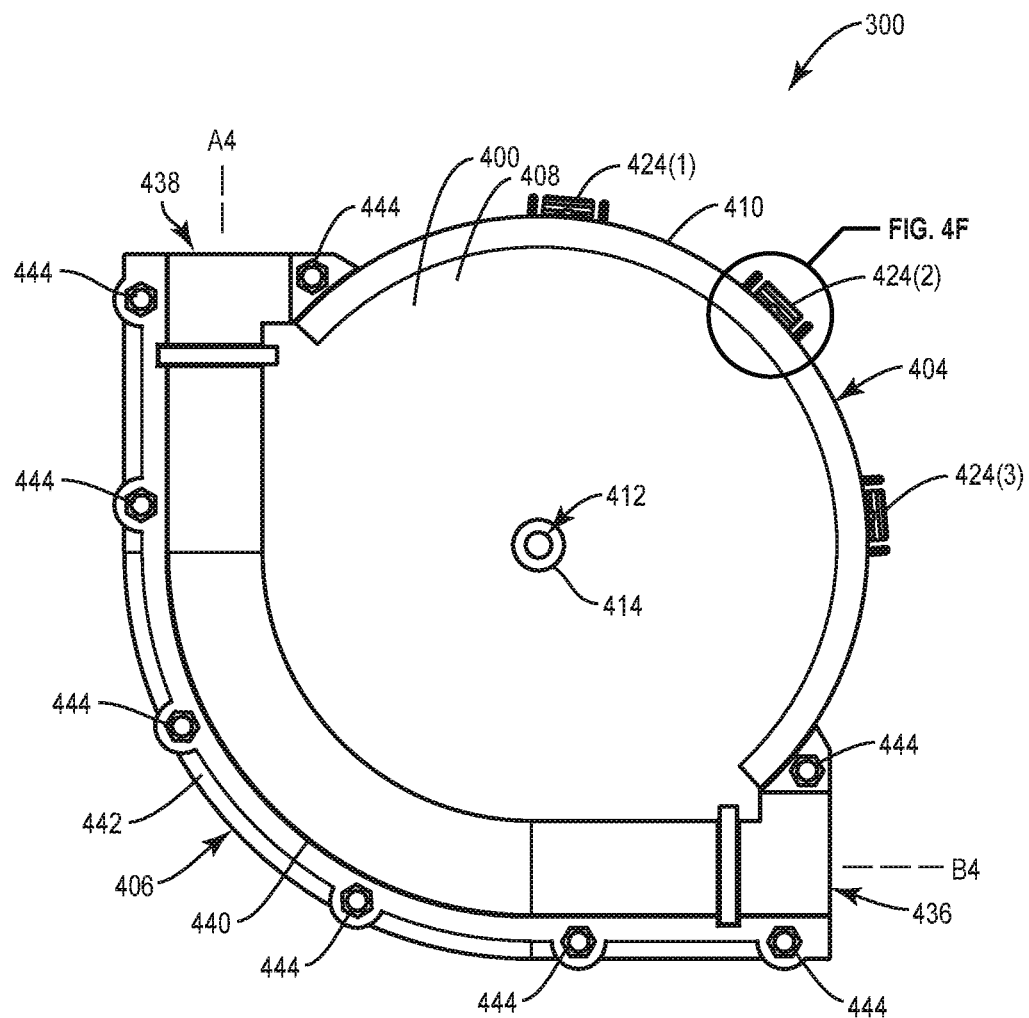
FIG. 4B is a top view of the top body of FIG. 4A.
Figure 4C:
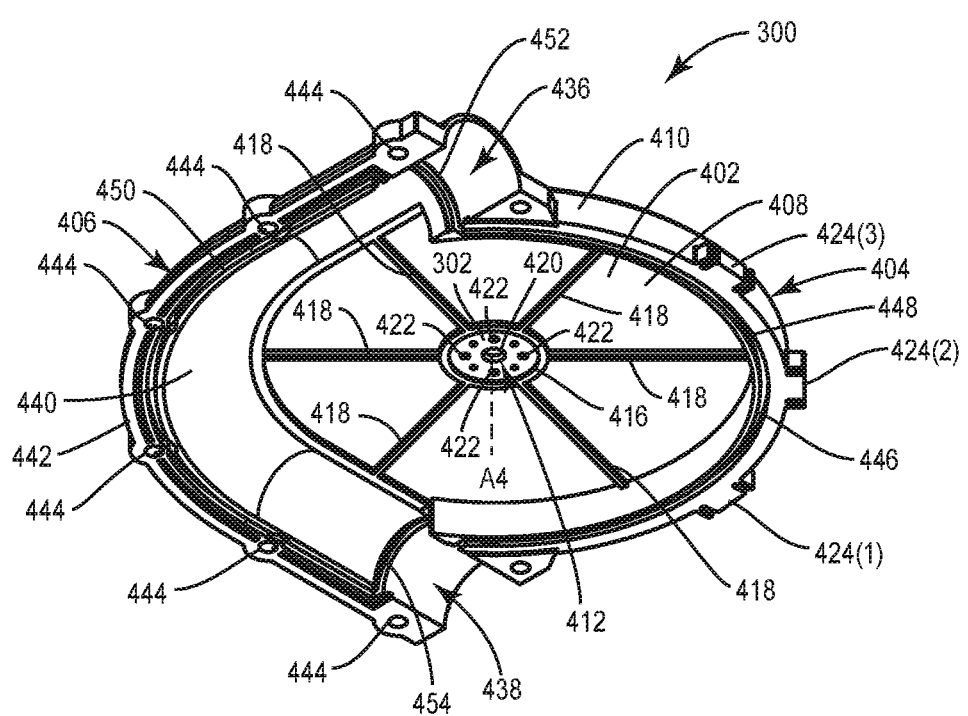
FIG. 4C is a bottom perspective view of the top body of FIG. 4A.
Figure 4D:
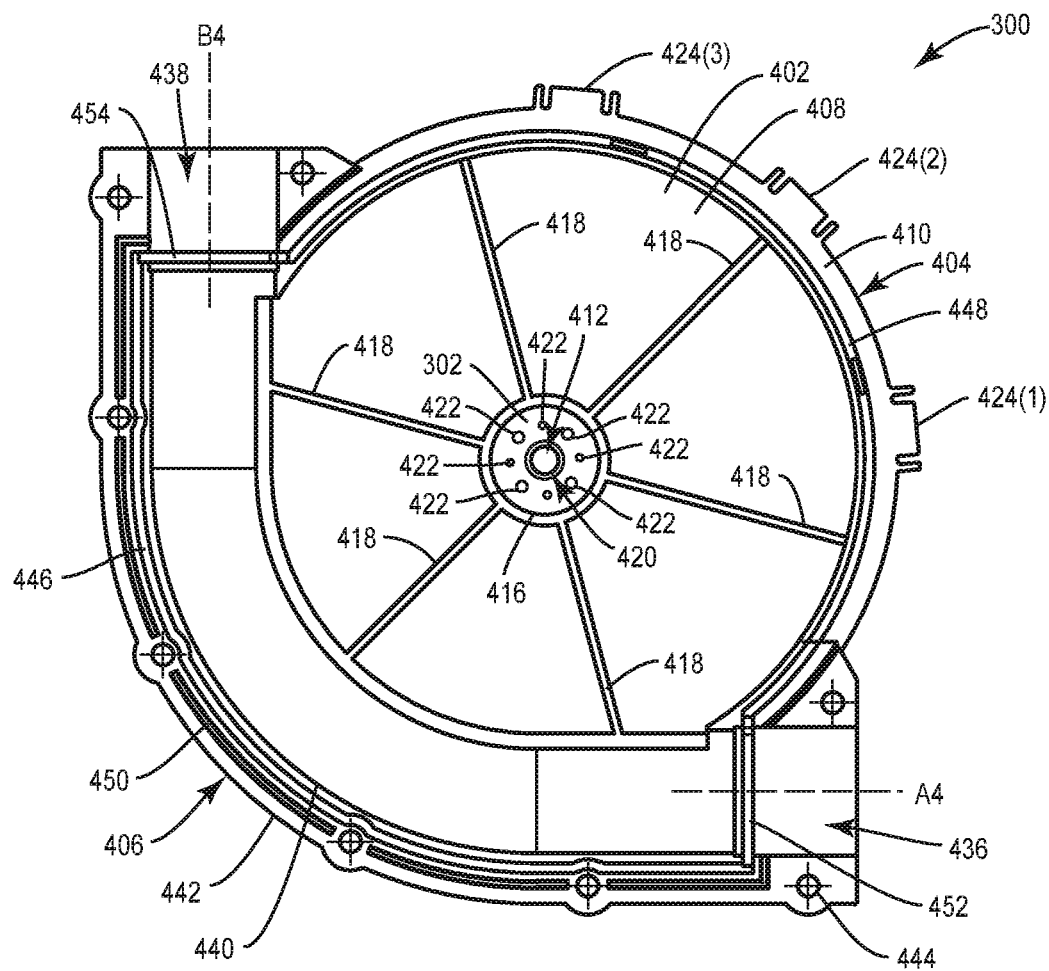
FIG. 4D is a bottom view of the top body of FIG. 4A.

Referring to FIGS. 4C-4E, the interior surface 402 of the top wall 408 of the wheel portion 404 includes an internal seat 416 surrounding the top center hole 412, and a plurality of top internal ribs 418 circumferentially positioned around and radially extending from the internal seat 416. The top internal ribs 418 provides increased strength and rigidity, however, positioning them at the interior surface 402 of the top body 300 avoids formation of pockets in the top surface 400 of the top body 300.

The internal seat 416 is configured to receive a top reinforcing washer 302 to provide structural support and rigidity. In other words, the top reinforcing washer 302 is attached at an interior surface 402 of the top body 300. The material of the top reinforcing washer 302 has a greater strength and rigidity than the material of the top body 300. As previously noted, the wheel assembly 204 is mounted at the top center hole 412, and the area around the top center hole 412 may be subject to increased deflection and/or stress, leading to an increased likelihood of structural damage or failure. The top reinforcing washer 302 provides increased strength and rigidity around the top center hole 412 at the mounting point of the wheel assembly 204, thereby decreasing the likelihood of structural damage or failure. The top reinforcing washer 302 includes a center hole 420 that aligns with the top center hole 412 of the top wall 408. Further, the top reinforcing washer 302 includes one or more peripheral holes 422 (may also be referred to as secondary holes). The top body 300 is made of plastic or non-metal material (also may be referred to as a first material), and the top reinforcing washer 302 is made of a metal or metal material (also may be referred to as a second material) and is positioned during the molding process such that a portion of the top body 300 integrally extends into at least one of the plurality of peripheral holes 422 in the top reinforcing washer 302, thereby maintaining position and preventing translation or rotation of the top reinforcing washer 302 around the top center hole 412 of the top wall 408 of the top body 300.

Referring to FIGS. 4A-4G, the top body 300 further includes a plurality of retainer clip mounts 424(1)-424(3) (referred to generally as retainer clip mount 424) circumferentially positioned along the peripheral wall 410. Each retainer clip mount 424 is configured to pivotably mount one of the plurality of retainer clips 306. Referring to FIGS. 4F-4G, each retainer clip mount 424 includes a center portion 426 defining a horizontal groove 428 to receive a portion of a retainer clip 306. A tab 430 extends from a top of the center portion 426 into the horizontal groove 428 to retain the portion of the retainer clip 306 within the horizontal groove 428.

A first lateral wall 432A is positioned towards a first side of the center portion 426 and defines a first lateral gap 434A between the first lateral wall 432A and the center portion 426. Similarly, a second lateral wall 432B is positioned towards a second side of the center portion 426 and defines a second lateral gap 434B between the second lateral wall 432B and the center portion 426. As explained in more detail below, the lateral walls 432A, 432B prevent lateral movement of the retainer clip 306 and the lateral gaps 434A, 434B allow the retainer clip 306 to pivot from a locked state to an unlocked state while being retained within the horizontal groove 428.

Referring to FIGS. 4A-4E, the channel portion 406 of the top body 300 defines a first port 436 at a first end of the channel portion 406 and a second port 438 at a second end of the channel portion 406 (opposite the first port 436). The first port 436 at least partially defines the first opening 216 of the angled channel 214 (see FIGS. 2A-2B) and the second port 438 at least partially defines the second opening 218 of the angled channel 214 (see FIGS. 2A-2B). A bend 440 is defined between the first port 436 and the second port 438, such that the first port 436 is rotationally offset from the second port 438 by 90 degrees. However, in certain embodiments the angle of the rotational offset may be more or less than 90 degrees.

The channel portion 406 includes a peripheral edge 442 extending along the channel portion 406 between the first port 436 and the second port 438. The peripheral edge 442 defines a plurality of counter bore hex holes 444 to receive a hex bolt therethrough to attach the top body 300 to the housing bottom subassembly 206B. The counter bore hex holes 444 prevent rotation of the hex bolt placed therein to facilitate assembly and application of a nut onto the hex bolt.

The interior surface 402 of the top body 300 further defines a gasket groove 446, which forms a general loop around the peripheral edges of the top body 300. In particular, the gasket groove 446 includes a wheel portion 448 extending along the peripheral wall 410 of the wheel portion 404, a channel portion 450 extending along the peripheral edge 442 of the channel portion 406, a first channel portion 452 across the interior surface 402 of the channel portion 406 proximate the first port 436, and a second channel portion 454 across the interior surface 402 of the channel portion 406 proximate the second port 438. The gasket groove 446 is configured to receive the housing gasket 304 to form a seal between the top body 300 and the housing bottom subassembly 208.

Figure 5A:
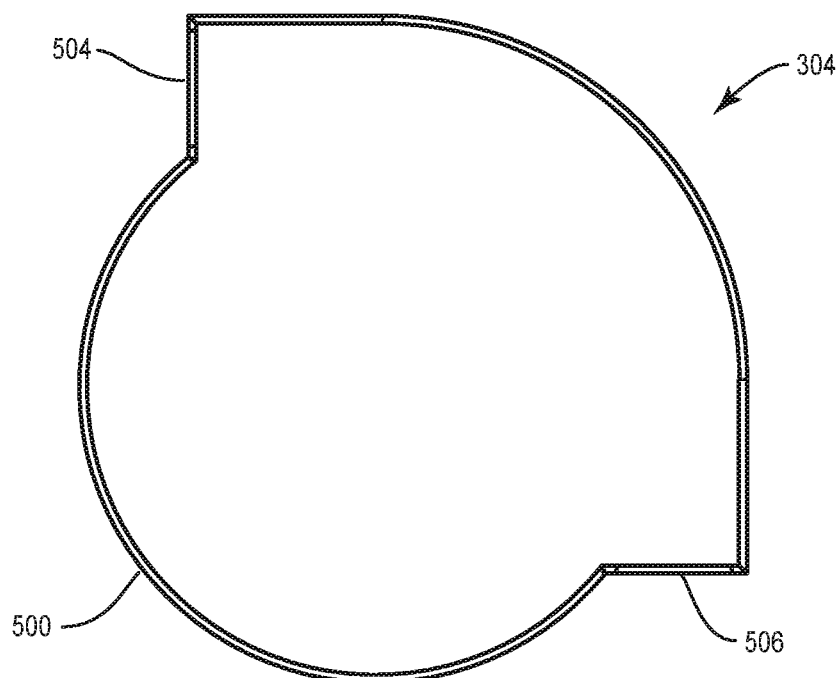
FIG. 5A is a top view of a housing gasket of the housing top subassembly of FIG. 3.
Figure 5B:
FIG. 5B is a left side view of the housing gasket of FIG. 5A.
Figure 5C:
FIG. 5C is a front view of the housing gasket of FIG. 5A.

FIGS. 5A-5C are views of the housing gasket 304 of the housing top subassembly 206 of FIG. 3. The housing gasket 304 is configured to be positioned in the gasket groove 446 of the top body 300. The housing gasket 304 includes a wheel portion 500 generally sized and shaped consistent with the periphery of the wheel portion 404 of the top body 300, and a peripheral channel portion 502 generally sized and shaped consistent with a periphery of the peripheral wall 410 of the top body 300. The wheel portion 500 and the peripheral channel portion 502 configured to form a seal between the top body 300 and the housing bottom subassembly 208.

The housing gasket 304 further includes a first inlet portion 504 integrally connecting first ends of the wheel portion 500 and the peripheral channel portion 502, and a second inlet portion 506 integrally connecting second ends of the wheel portion 500 and the peripheral channel portion 502. The first inlet portion 504 is configured to form a seal between the first port 436 of the channel portion 406 of the top body 300 and a top portion of a tube positioned in the first port 436.

In this way, the wheel portion 500 and the peripheral channel portion 502 are positioned in the same plane as one another. The first inlet portion 504 and the second inlet portion 506 extend perpendicularly from the wheel portion 500 and the peripheral channel portion 502. The first inlet portion 504 rotationally offset from the second inlet portion 506.

Figure 6A:
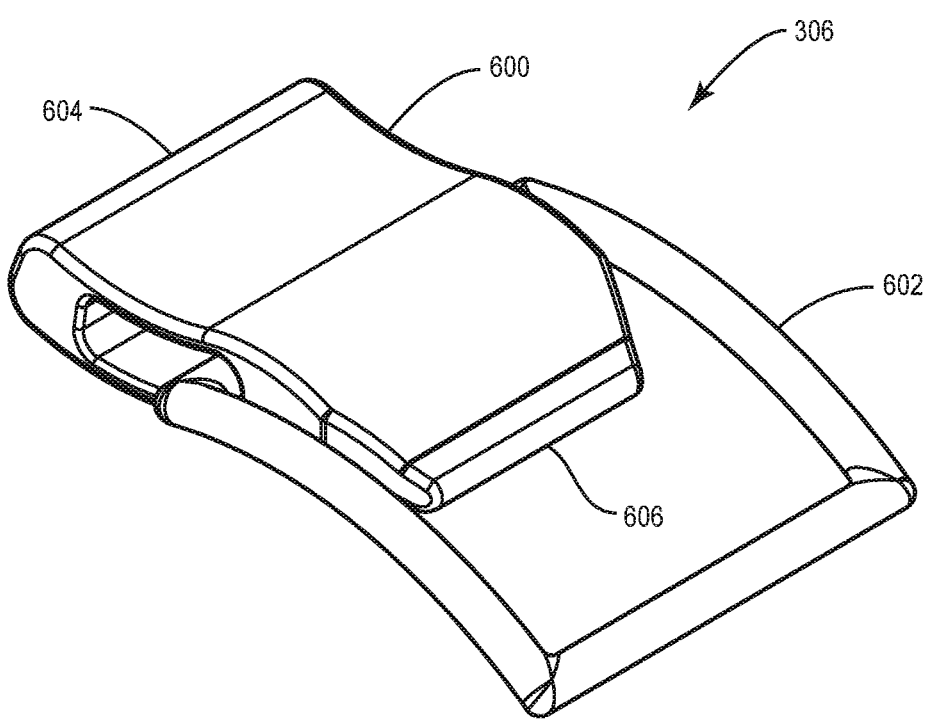
FIG. 6A is a top perspective view of a retainer clip of the housing top subassembly of FIG. 3.
Figure 6B:
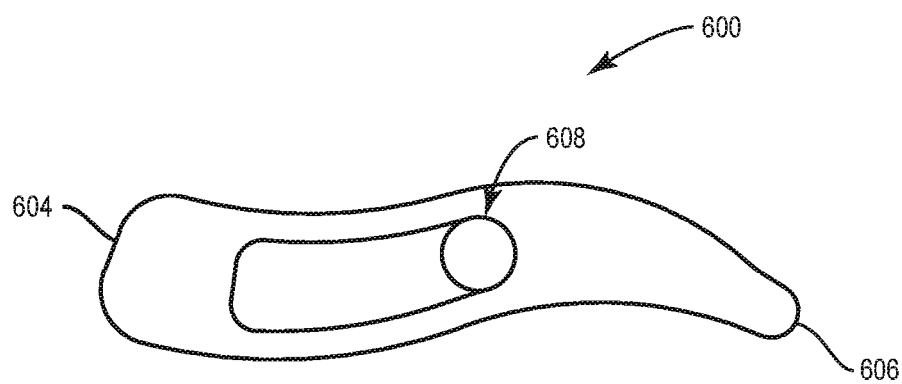
FIG. 6B is a side view of a lever of the retainer clip of FIG. 6A.
Figure 6C:
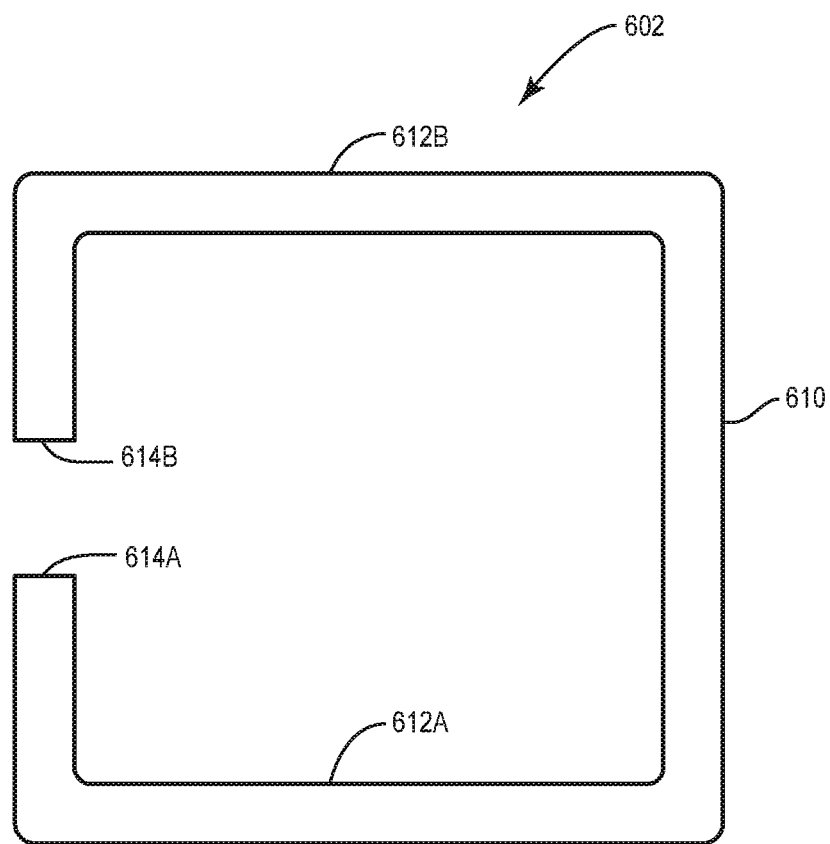
FIG. 6C is a top view of a wire of the retainer clip of FIG. 6A.

FIGS. 6A-6C are views of a retainer clip 306 of the housing top subassembly 206 of FIG. 3. As explained in more detail below, the retainer clip 306 provides for tool-less entry into the interior 208 of the chain disk corner 200. The retainer clip 306 includes a lever 600 and a wire 602 rotatably attached to the lever 600.

Referring to FIGS. 6A-6B, the lever 600 includes a grip end 604 and an insertion end 606 opposite the grip end 604. The grip end 604 provides a surface for a user to rotate the lever, and the insertion end 606 is configured to engage a portion of the housing bottom subassembly 208. The lever 600 further includes a first hole 608A a second hole 608B (not shown) in lateral sides of the lever 600 to rotatably engage the wire 602.

Referring to FIGS. 6A and 6C, the wire 602 forms a generally square shape including a base 610 with a first leg 612A integrally extending from a first end of the base 610 and a second leg 612B integrally extending from a second end of the base 610 (and in the same direction as the first leg 612A. A first end 614A integrally extends inwardly from an end of the first leg 612A (opposite the base 610) and a second end 614B integrally extends inwardly from an end of the second leg 612B (opposite the base 610). In this way, the first end 614A and the second end 614B are axially aligned but separated from one another.

Referring to FIG. 6A, the first end 614A of the wire 602 is positioned within the first hole 608A of the lever 600, and the second 614B of the wire 602 is positioned within the second hole 608B (not shown) of the lever 600. In this way, the lever 600 and the wire 602 are pivotably attached to one another. The base 610 of the wire 602 is configured to be positioned in the horizontal groove 428 of the peripheral retainer clip mounts 424 of the top body 300, such that the wire 602 is rotatably mounted to the top body 300 (see FIG. 3).

Figure 7:
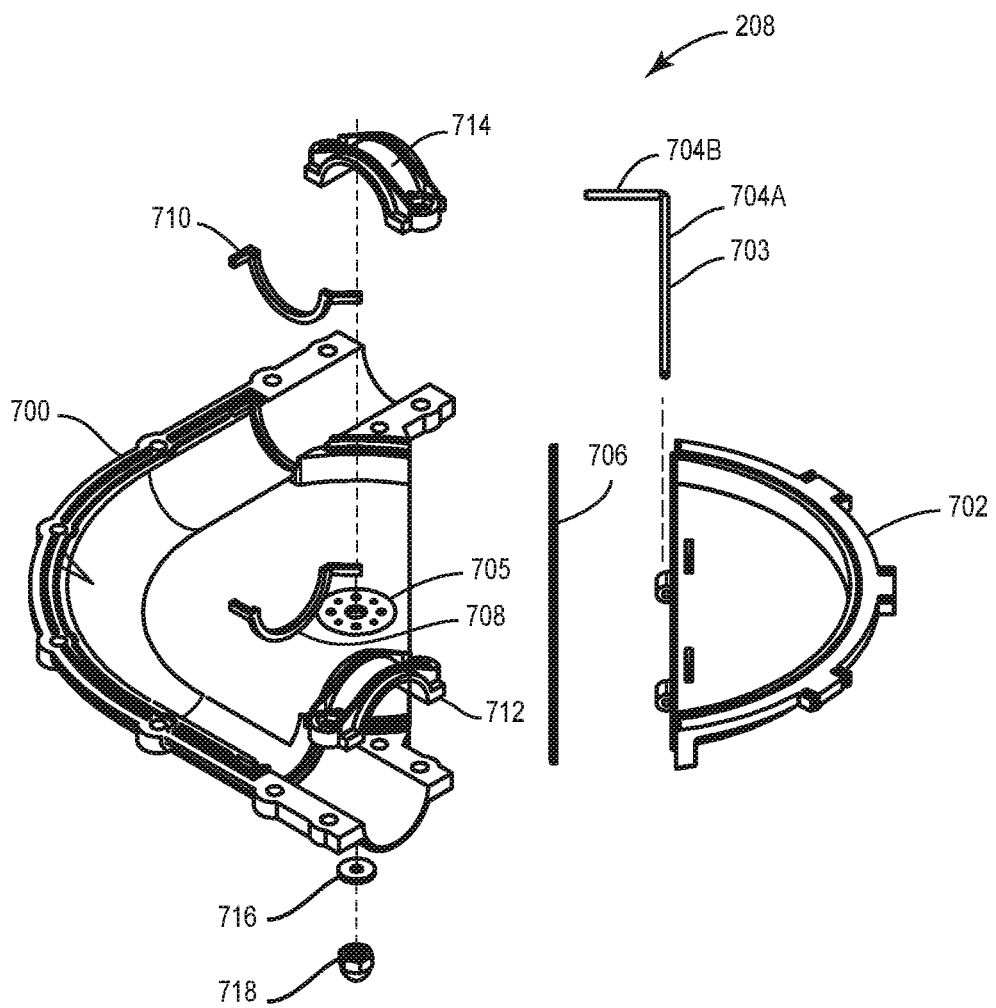
FIG. 7 is an exploded top perspective view of a housing bottom subassembly of FIGS. 2A-2C.

FIG. 7 is an exploded top perspective view of a housing bottom subassembly 208 of FIGS. 2A-2C. The housing bottom subassembly 208 includes a bottom body 700, a window 702 hingedly connected to the bottom body 700 by an L-shaped rod 703 to provide selective access to the interior 208 of the chain disk corner 200. The L-shaped rod 703 includes a long leg 704A and a short leg 704B perpendicular thereto. The housing bottom subassembly 208 further includes a bottom reinforcing washer 705 (may also be referred to as a stiffening washer) and a window gasket 706 positioned between the bottom body 700 and the window 702 to form a seal therebetween. The housing bottom subassembly 208 further includes a first channel gasket 708 to create a seal between the bottom body 700 and an inlet tube (not shown) and a second channel gasket 710 to create a seal between the bottom body 700 and an outlet tube (not shown). The housing bottom subassembly 208 further includes a first channel clamp 712 to engage and secure the inlet tube to the bottom body 700 and a second channel clamp 714 to engage and secure the outlet tube to the bottom body 700. The housing bottom subassembly 208 further includes a bottom washer 716 and a bottom nut 718 to engage the wheel assembly 204, thereby mounting the wheel assembly 204 to the bottom body 700 of the housing bottom subassembly 208.

The bottom body 700 is made of a first, opaque material. The window is made of a second, translucent material. Note that translucent, at least as used herein, comprises semi-transparent and transparent. In particular, as used herein, the term semi-transparent identifies objects that allow at least some light to pass through at least part of the object and transparent identifies objects that allow substantially all light to pass through all or part of the object. In some embodiments, at least part of the body window is semi-transparent (e.g., translucent but not transparent). The second translucent material has a greater strength and rigidity than the first opaque material.

FIGS. 8A-8E are views of a bottom body 700 of the housing bottom subassembly 208 of FIG. 7. The bottom body 700 includes a bottom surface 800 (may also be referred to as an exterior surface) and an interior surface 802 (may also be referred to as a top surface) opposite to the bottom surface 800. The bottom body 700 further includes a primary wheel portion 804 which partially defines the wheel cavity 212 (see FIGS. 2A-2C) and a channel portion 806 proximate the primary wheel portion 804 which partially defines the angled channel 214 (see FIGS. 2A-2C).

The primary wheel portion 804 includes a bottom wall 808 with a peripheral wall 810 extending at least partially around the bottom wall 808. In particular, the bottom wall 808 is at least partially surrounded by a combination of the channel portion 806 and the peripheral wall 810. The bottom wall 808 further defines a planar edge 812, such that the primary wheel portion 804 only defines a portion of a circle. Further, the bottom wall 808 defines a bottom center hole 814 extending through the bottom wall 808 from the bottom surface 800 to the interior surface 802. The bottom surface 800 defines an external seat 816 surrounding the bottom center hole 814 to receive the bottom washer 716, which facilitates assembly as the external seat 816 aligns the bottom washer 716 with the bottom center hole 814. The interior surface 802 of the bottom wall 808 of the primary wheel portion 804 is generally smooth and includes no pockets. In other words, the interior surface 802 of the bottom wall 808 does not include any pockets where water or particulate can accumulate. Instead, the water runs off the bottom surface 800. It is noted that the interior surface does not include internal ribs, thereby facilitating self-cleaning by the wheel assembly 204.

The interior surface 802 of the bottom wall 808 of the primary wheel portion 804 includes an internal seat 818 surrounding the bottom center hole 814, and a plurality of bottom external ribs 820 circumferentially positioned around and radially extending from the internal seat 818. The bottom external ribs 820 provide increased strength and rigidity. The internal seat 818 is configured to receive the bottom reinforcing washer 705 to provide structural support and rigidity. As previously noted, the wheel assembly 204 is mounted at the bottom center hole 814, and the area around the bottom center hole 814 may be subject to increased deflection and/or stress, leading to an increased likelihood of structural damage or failure. The bottom reinforcing washer 705 provides increased strength and rigidity at the mounting point of the wheel assembly 204, thereby decreasing the likelihood of structural damage or failure. The bottom reinforcing washer 705 includes a center hole 822 that aligns with the bottom center hole 814 of the bottom wall 808. Further, the bottom reinforcing washer 705 includes one or more peripheral holes 824 (may also be referred to as secondary holes). The bottom body 700 is made of plastic or non-metal material (also may be referred to as a first material), and the bottom reinforcing washer 705 is made of a metal or metal material (also may be referred to as a second material) and is positioned during the molding process such that a portion of the bottom body 700 integrally extends into at least one of the plurality of peripheral holes 824 in the bottom reinforcing washer 705, thereby maintaining position and preventing rotation of the bottom reinforcing washer 705 around the bottom center hole 814 of the bottom wall 808 of the bottom body 700.

Referring to FIGS. 8A-8E, the channel portion 806 of the bottom body 700 defines a first port 826 at a first end of the channel portion 406 and a second port 828 at a second end of the channel portion 806 (opposite the first port 826). The first port 826 at least partially defines the first opening 216 of the angled channel 214 (see FIGS. 2A-2B) and the second port 828 at least partially defines the second opening 218 of the angled channel 214 (see FIGS. 2A-2B). A bend 830 is defined between the first port 826 and the second port 828, such that the first port 826 is rotationally offset from the second port 828 by 90 degrees. However, in certain embodiments the angle of the rotational offset may be more or less than 90 degrees.

The channel portion 806 includes a peripheral edge 832 extending along the channel portion 806 between the first port 826 and the second port 828. The peripheral edge 832 defines a plurality of holes 834 to receive a hex bolt therethrough to attach the top body 300 to the bottom body 700.

The interior surface 802 of the bottom body 700 further defines a first gasket groove 836 proximate the first port 826, and a second gasket groove 838 proximate the second port 828. In particular, the first channel gasket 708 is positioned in the first gasket groove 836 and the second channel gasket 710 is positioned in the second gasket groove 838.

Figure 8A:
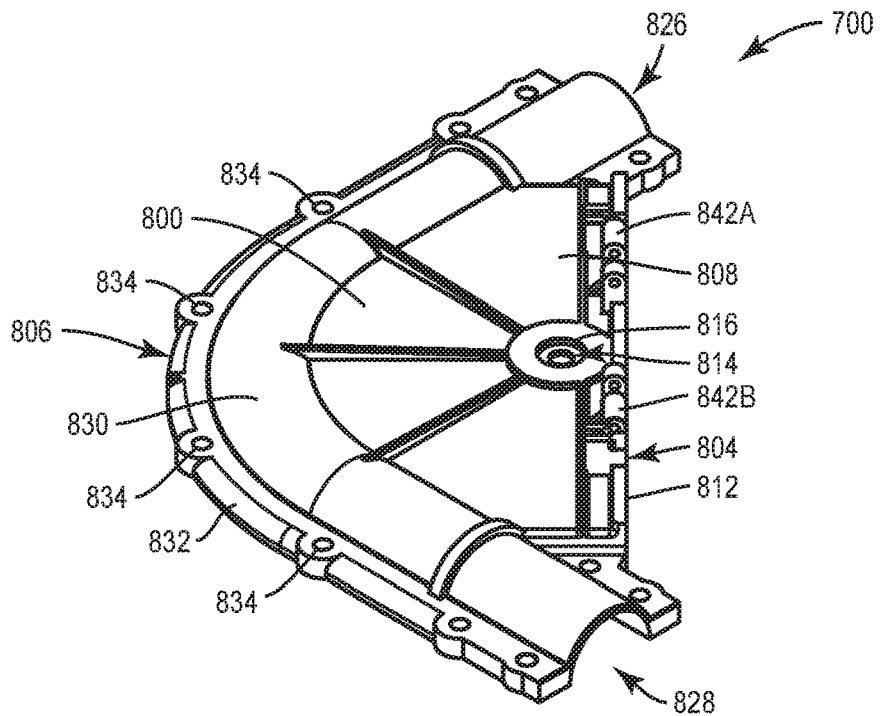
FIG. 8A is a bottom perspective view of a bottom body of the housing bottom subassembly of FIG. 7.
Figure 8B:
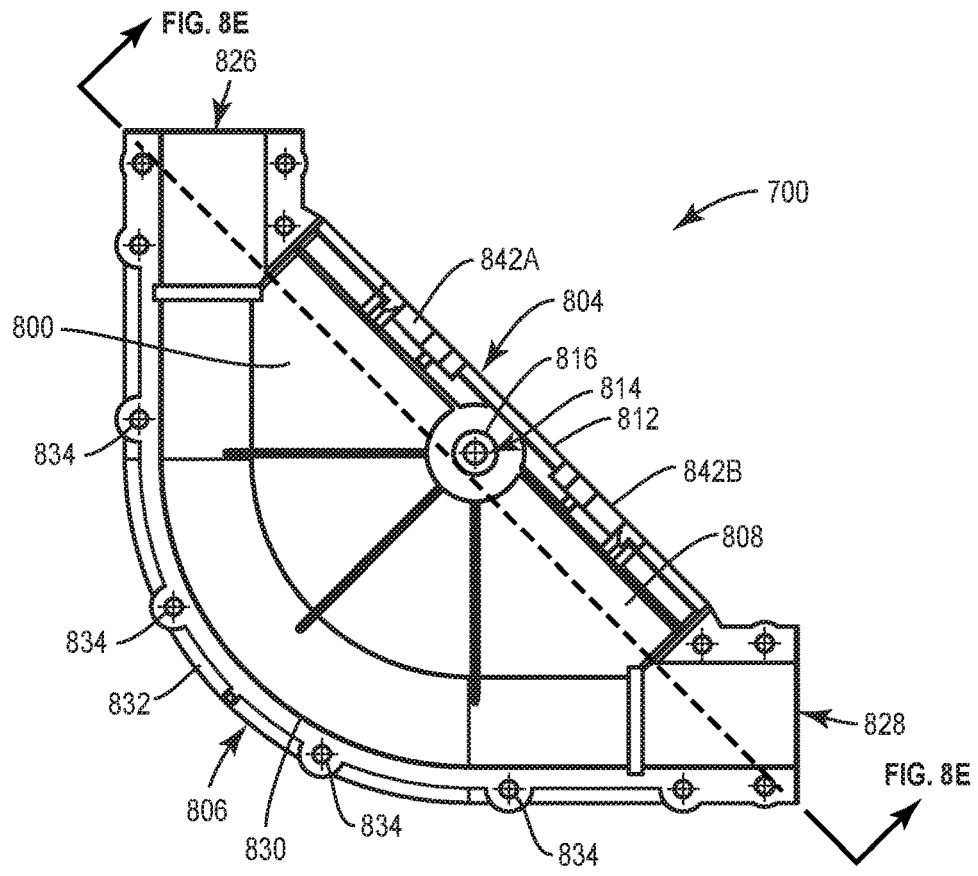
FIG. 8B is a bottom view of the bottom body of FIG. 8A.
Figure 8C:
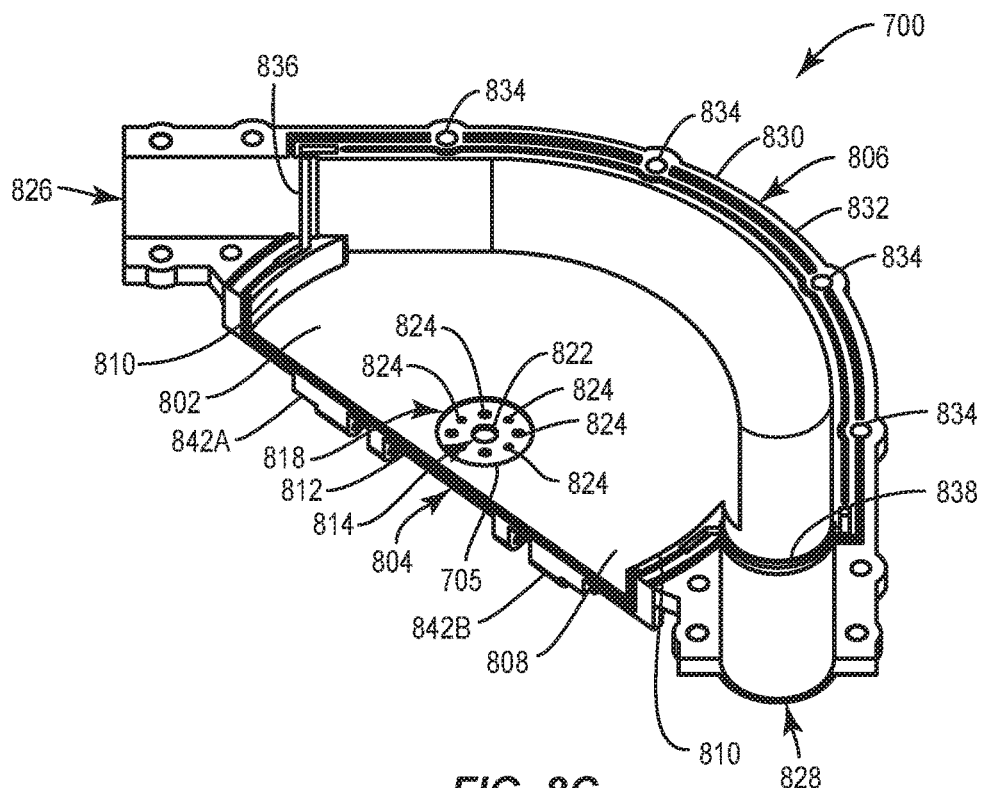
FIG. 8C is a top perspective view of the bottom body of FIG. 8A.
Figure 8D:
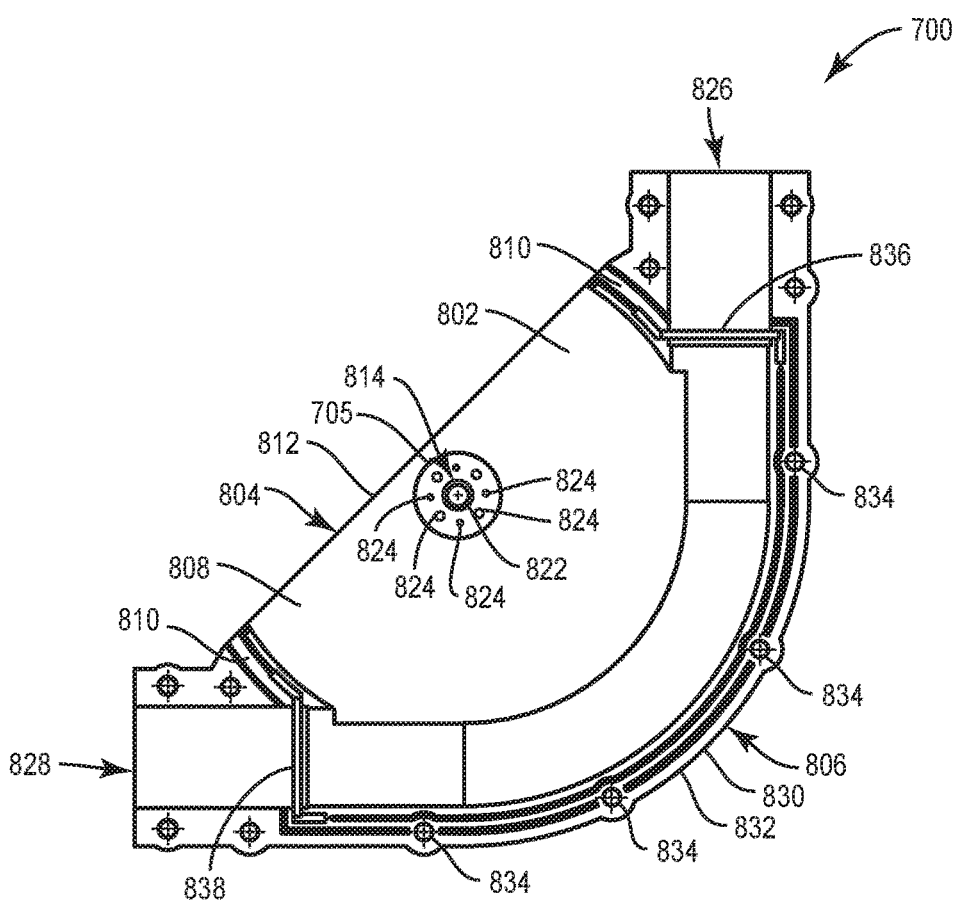
FIG. 8D is a top view of the bottom body of FIG. 8A.
Figure 8E:
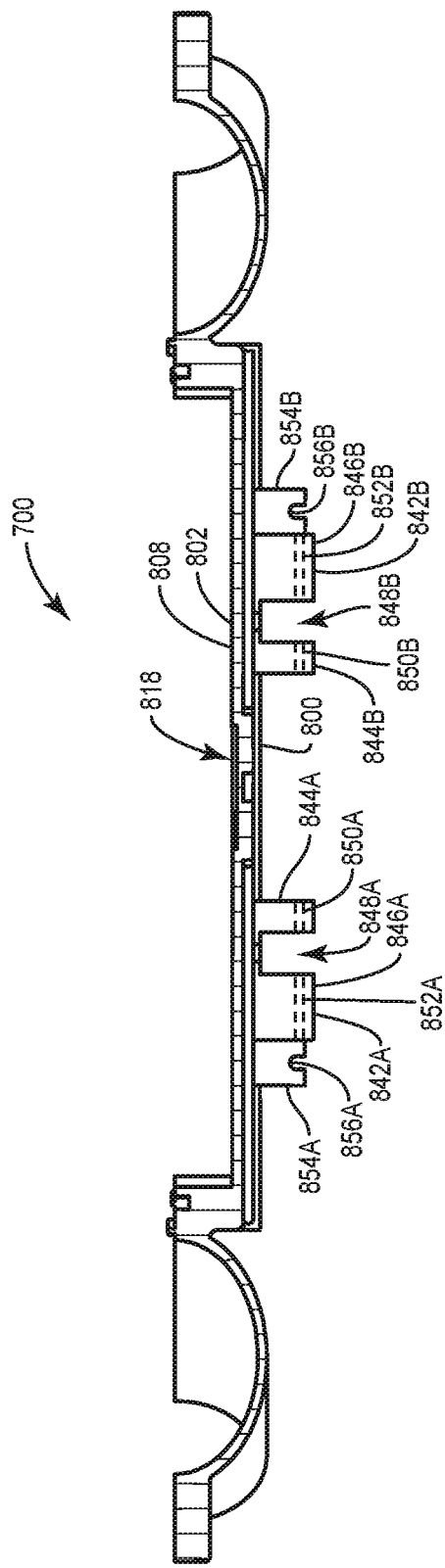
FIG. 8E is a cross-sectional side view of the bottom body of FIG. 8A.
Figure 9A:
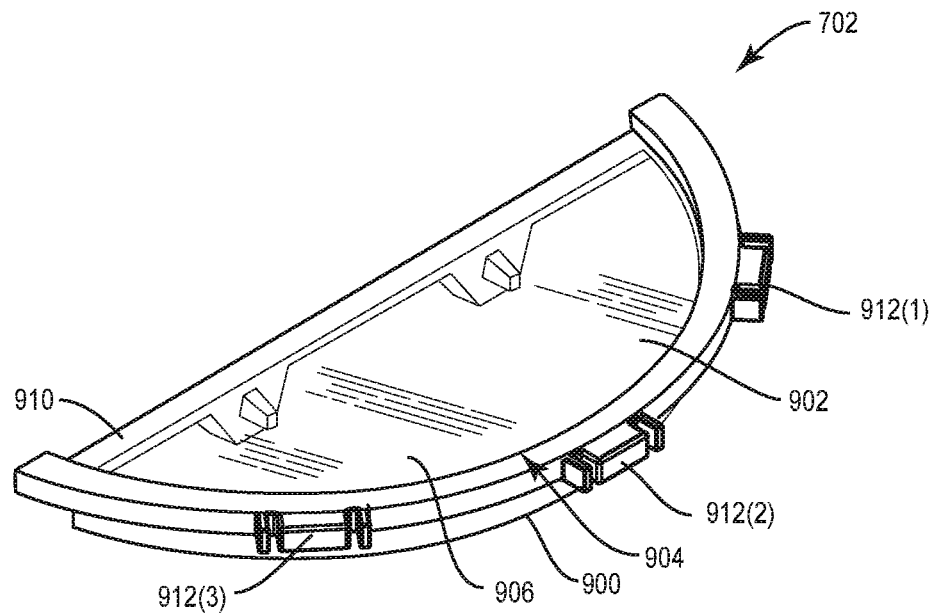
FIG. 9A is a top perspective view of a window of the housing bottom subassembly of FIG. 7.
Figure 9B:
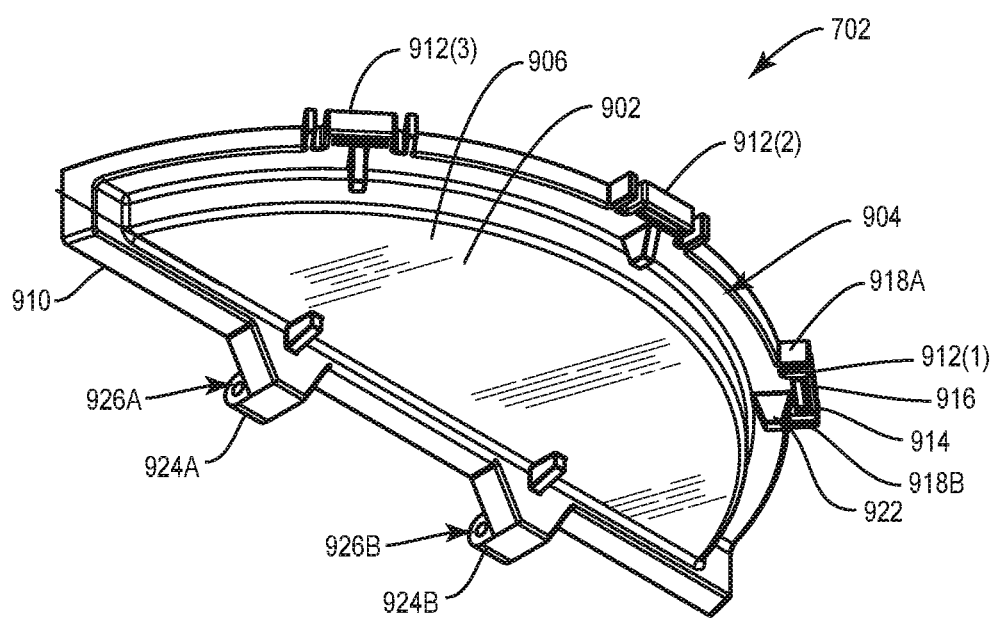
FIG. 9B is a bottom perspective view of the window of FIG. 9A.
Figure 9C:
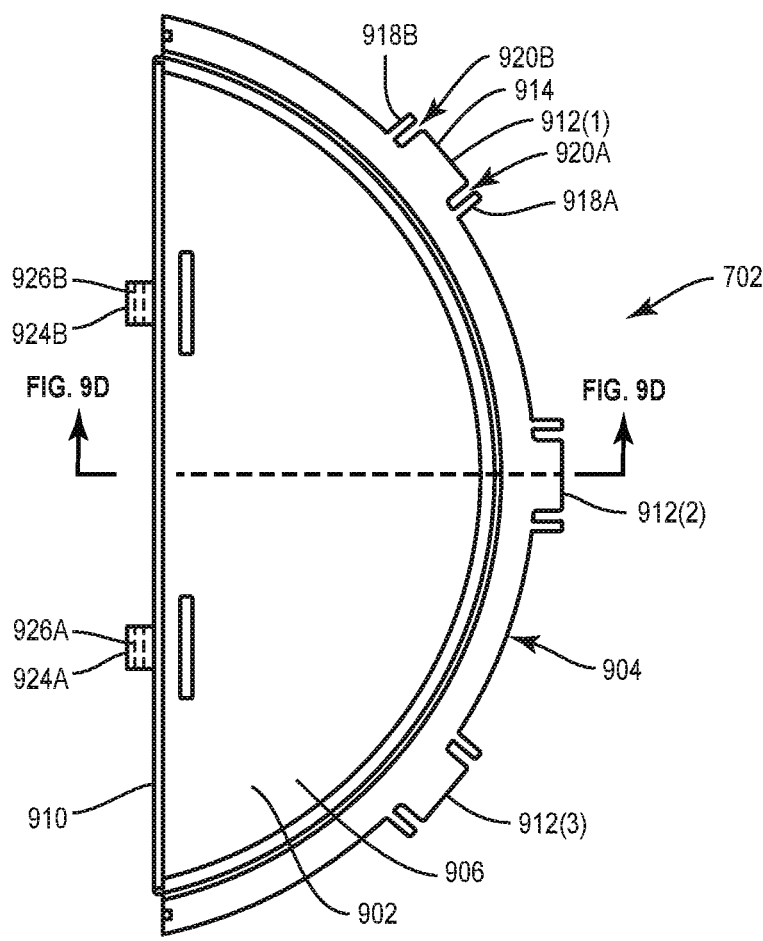
FIG. 9C is a bottom view of the window of FIG. 9A.
Figure 9D:
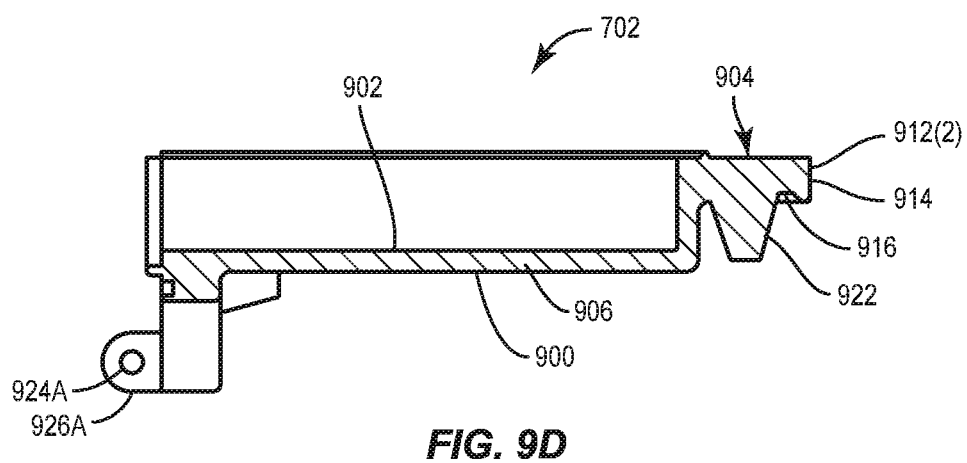
FIG. 9D is a cross-sectional side view of the window of FIG. 9A.
Figure 9E:
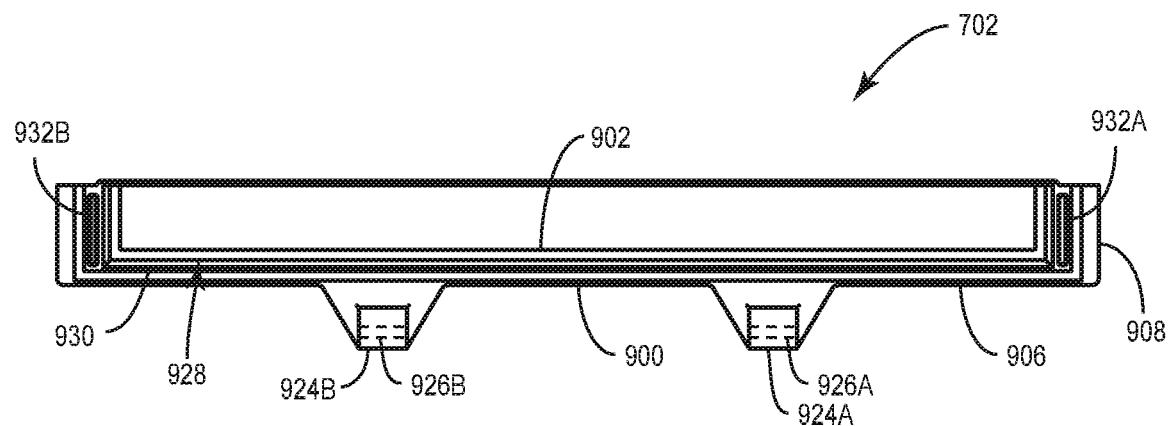
FIG. 9E is a back view of the window of FIG. 9A.

The bottom body 700 further includes a hinge connectors 842A, 842B for mounting the window 702 of the housing bottom subassembly 208. Referring to FIG. 8E, the first hinge connector 842A and the second hinge connector 842B are proximate the planar edge 812.

The first hinge connector 842A includes a medial support 844A and a distal support 846A with a gap 848A therebetween to receive a portion of the window 702. The medial support 844A defines a medial bore 850A and the distal support 846A defines a distal bore 852A (aligned with the medial bore 850A), such that the L-shaped rod 703 can be positioned through the medial bore 850A and the distal bore 852A. A retainer structure 854A defines a recess 856A to receive the L-shaped rod and prevent axial movement of the rod when positioned in the medial bore 850A and the distal bore 852A.

The second hinge connector 842B includes a medial support 844B and a distal support 846B with a gap 848B therebetween to receive a portion of the window 702. The medial support 844B defines a medial bore 850B and the distal support 846A defines a distal bore 852B (aligned with the medial bore 850B), such that the L-shaped rod 703 can be positioned through the medial bore 850B and the distal bore 852B. A retainer structure 854B defines a recess 856A to receive the L-shaped rod and prevent axial movement of the rod when positioned in the medial bore 850A and the distal bore 852A.

FIGS. 9A-9E are views of the window 702 of the housing bottom subassembly 208 of FIG. 7. The window 702 includes an exterior surface 900 (may also be referred to as a top surface) and an interior surface 902 (may also be referred to as a bottom surface) opposite to the exterior surface 900. The window 702 further includes a secondary wheel portion 904 which partially defines the wheel cavity 212 (see FIGS. 2A-2C).

The secondary wheel portion 904 includes a bottom wall 906 with a peripheral wall 908 extending at least partially around the bottom wall 906. The bottom wall 906 further defines a planar edge 910, such that the primary wheel portion 804 only defines a portion of a circle. The interior surface 802 of the bottom wall 808 of the primary wheel portion 804 is generally smooth and includes no pockets. In other words, the interior surface 802 of the bottom wall 808 does not include any pockets where water or particulate can accumulate. It is noted that the interior surface does not include radially extending ribs, thereby facilitating self-cleaning by the wheel assembly 204.

The window 702 further includes a plurality of retainer clip receptacles 912(1)-912(3) (referred to generally as retainer clip receptacle 912) circumferentially positioned along the peripheral wall 908. Each retainer clip receptacle 912 is configured to engage one of the plurality of retainer clips 306 (see FIGS. 6A-6C). In particular, each retainer clip receptacle 912 includes a center portion 914 defining a horizontal groove 916 to receive a portion of a retainer clip 306.

A first lateral wall 918A is positioned towards a first side of the center portion 914 and defines a first lateral gap 920A between the first lateral wall 918A and the center portion 914. Similarly, a second lateral wall 918B is positioned towards a second side of the center portion 914 and defines a second lateral gap 920B between the second lateral wall 918B and the center portion 914. As explained in more detail below, the lateral walls 918A, 918B prevent lateral movement of the retainer clip 306, and the lateral gaps 920A, 920B allow the retainer clip 306 to engage and disengage the horizontal groove 916 of the retainer clip receptacle 912. Each retainer clip receptacle 912 also includes a lever stop 922 positioned next to the horizontal groove 916 to retain the retainer clip 306 in locked state (may also be referred to as a closed orientation) and provide access for a user to move the retainer clip 306 to an unlocked state (may also be referred to as an open position).

The window 702 further includes a first hinge connector 924A and a second hinge connector 924B at the planar edge 910. The first hinge connector 924A defines a first bore 926A and the second hinge connector 924B defines a second bore 926B. In this way, the first hinge connector 924A and the second hinge connector 924B engage the hinge connectors 842A, 842B of the bottom body 700 (see FIG. 7). In particular, for example, the first hinge connector 924A of the window 702 is positioned within gap 848A of the first hinge connector 842A of the bottom body 700, and the first bore 926A of the first hinge connector 924A of the window 702 is aligned with the medial bore 850A of the medial support 844A and the distal bore 852A of the distal support 846A to receive the L-shaped rod 703 therethrough.

The planar edge 910 of the window 702 further includes gasket groove 928 including a bottom wall groove 930, a first peripheral groove 932A in a first end of the peripheral wall 908 end extending from a first end of the bottom wall groove 930, and a second peripheral groove 932B in a second end of the peripheral wall 908 extending from a second end of the bottom wall groove 930.

Figure 10:
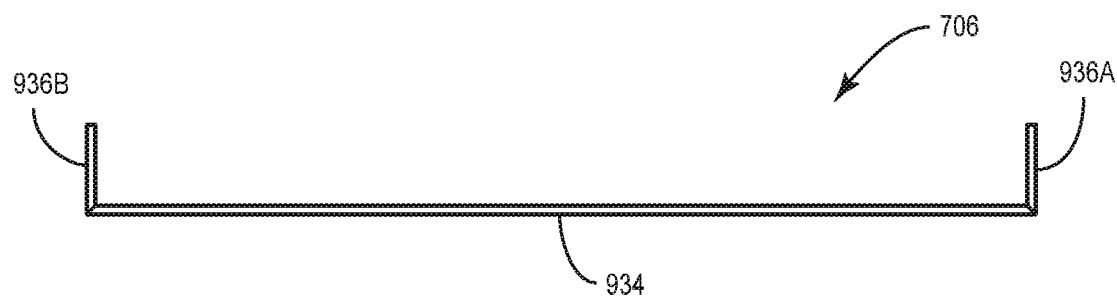
FIG. 10 is a window gasket of the housing bottom subassembly of FIG. 7.

FIG. 10 is a window gasket 706 of the housing bottom subassembly of FIG. 7. In particular, the window gasket 706 is positioned at the planar edge 910 of the window 702 within the gasket groove 928. In particular, the window gasket 706 includes a base 934, a first leg 936A integrally extending from a first end of the base 934, and a second leg 936B integrally extending from a second end of the base 934. The base 934 is positioned within the bottom wall groove 930, the first leg 936A positioned within the first peripheral groove 932A, and the second leg 936B positioned within the second peripheral groove 932B. In this way, the window gasket 706 forms a seal between the bottom body 700 and the window 702 when the window 702 is in the closed position.

Figure 11A:
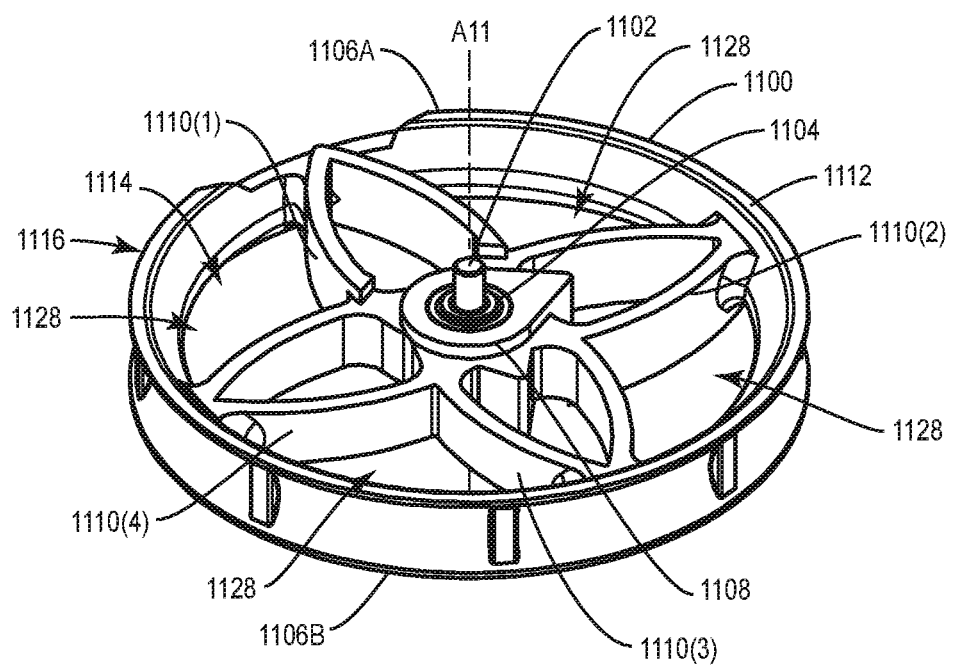
FIG. 11A is a top perspective view of a wheel assembly of FIG. 2A-2C.

FIG. 11A is a top perspective view of a wheel assembly 204 of FIGS. 2A-2C, and FIGS. 11B-11D are views of the wheel 1100 of the wheel assembly 204. Referring to FIG. 11A, the wheel assembly 204 includes a wheel 1100 rotatably mounted to a threaded axle 1102 by a bearing 1104. The threaded axle 1102 extends through the top body 300 and the bottom body 700, where a top washer 308 and a top nut 310 secures a first end of the threaded axle 1102. A bottom washer 716 and a bottom nut 718 secure a second end of the threaded axle 1102, thereby mounting the wheel assembly 204 to the housing 202 (see FIGS. 2A-2C).

The wheel 1100 defines a first side 1106A and a second side 1106B (opposite the first side 1106A). The wheel 1100 includes a central hub 1108 defining a central axis A1, a plurality of spokes 1110(1)-1110(4) (may be referred to generally as spokes 1110) integrally extending from the central hub 1108, and a rim 1112 at an end of the spokes 1110, opposite the central hub 1108 and aligned with the central axis A11. In other words, the plurality of spokes 1110 are positioned between and integrally connect the central hub 1108 and the rim 1112. The rim 1112 defines an interior 1114 (within the rim 1112) and an exterior 1116 (outside the rim 1112) of the wheel 1100.

Figure 11B:
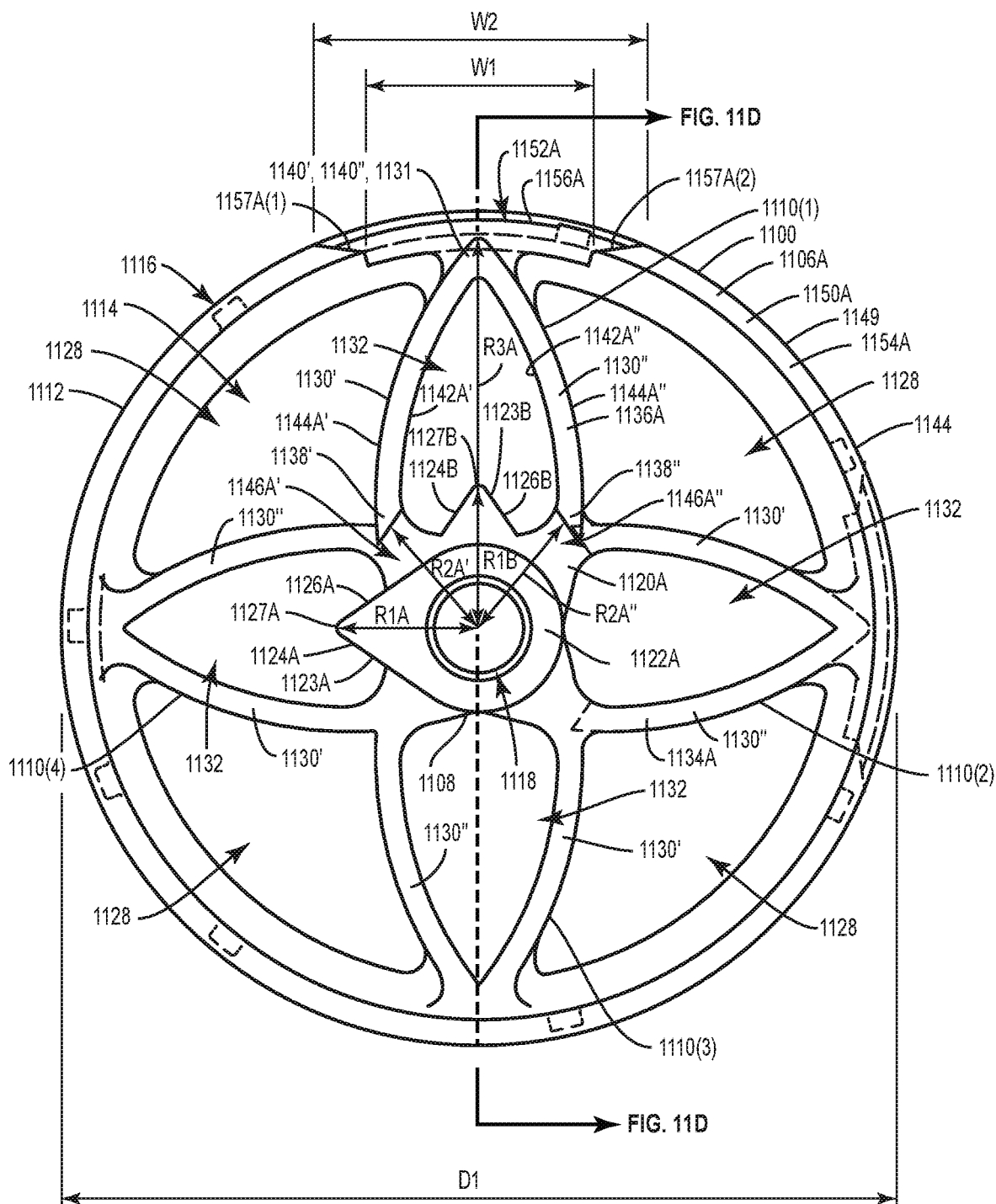
FIG. 11B is a top view of a wheel of the wheel assembly of FIG. 11A.

Referring to FIG. 11B, the central hub 1108 defines a center hole 1118 configured to receive the bearing 1104 therein. Further, on the first side 1106A, the central hub 1108 further includes a top recessed surface 1120A and a top extended surface 1122A, both perpendicular to the central axis A11. The top extended surface 1122A extends farther along the central axis A11 than the top recessed surface 1120A to provide a sweeping surface to self-clean the interior 1114 of the wheel 1100. In particular, the top extended surface 1122A forms a top teardrop sweep 1123A including a first top sweeping surface 1124A (may also be referred to as a first inverted sweeping surface) and a second top sweeping surface 1126A (may also be referred to as a second inverted sweeping surface) which intersect with each other at a point 1127A at a first radius R1A (from the central axis A11). The first top sweeping surface 1124A and the second top sweeping surface 1126A extend along the central axis A11 and are not aligned along a radius of the wheel 1100. In other words, the first top sweeping surface 1124A extends at least from the top recessed surface 1120A to the top extended surface 1122A, or from the first side 1106A toward the second side 1106B.

In this way, for example, when the wheel assembly 204 (see FIGS. 2A-2C) is mounted within the housing bottom subassembly 206 (see FIGS. 2A-2C) such that the first side 1106A of the wheel 1100 is positioned proximate the interior surface 802 (see FIG. 8A-8E) of the bottom body 700 (see FIG. 7), the top extended surface 1108A of the central hub 1108 contacts the interior surface 802 of the bottom body 700. As the wheel 1100 rotates clockwise within the housing 202, any feed or other particulate within the first radius R1A is swept by the first sweeping surface to a point beyond the first radius R1A. Similarly, when the wheel 1100 rotates counter-clockwise within the housing 202, any feed or other particulate within the first radius R1A is swept by the second sweeping surface to a point beyond the first radius R1A.

Figure 11C:
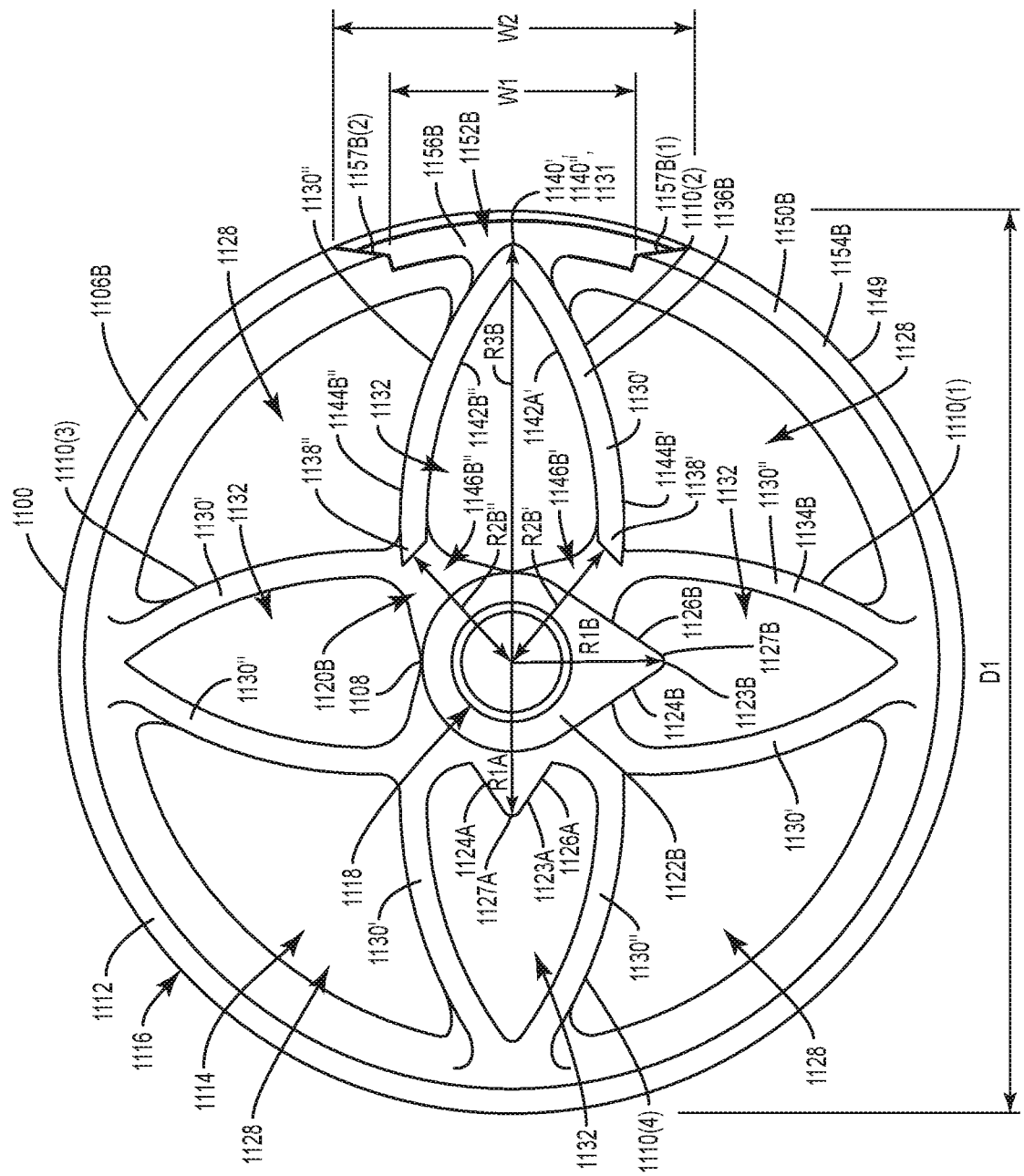
FIG. 11C is a bottom view of the wheel of the wheel assembly of FIG. 11A.

Referring to FIG. 11C, similarly, on the second side 1106B, the central hub 1108 further includes a bottom recessed surface 1120B and a bottom extended surface 1122B, both perpendicular to the central axis A11. The bottom extended surface 1122B extends farther along the central axis A11 than the bottom recessed surface 1120B to provide a sweeping surface to self-clean the interior 1114 of the wheel 1100. In particular, the bottom extended surface 1122B forms a bottom teardrop sweep 1123B including a first bottom sweeping surface 1124B (may also be referred to as a first upright sweeping surface) and a second bottom sweeping surface 1126B (may also be referred to as a second upright sweeping surface) which intersect with each other at a second radius R1B (from the central axis A11). The first bottom sweeping surface 1124B and the second bottom sweeping surface 1126B extend along the central axis A11 and are not aligned along a radius of the wheel 1100. In other words, the first bottom sweeping surface 1124B extends at least from the bottom recessed surface 1120B to the bottom extended surface 1122B, or from the second side 1106B toward the first side 1106A.

In this way, for example, when the wheel assembly 204 (see FIGS. 2A-2C) is mounted within the housing bottom subassembly 206 (see FIGS. 2A-2C) such that the second side 1106B of the wheel 1100 is positioned proximate the interior surface 802 (see FIG. 8A-8E) of the bottom body 700 (see FIG. 7), the bottom extended surface 1122B of the central hub 1108 contacts the interior surface 802 of the bottom body 700. As the wheel 1100 rotates clockwise within the housing 202, any feed or other particulate within the second radius R1B is swept by the first sweeping surface to a point beyond the second radius R1B. Similarly, when the wheel 1100 rotates counter-clockwise within the housing 202, any feed or other particulate within the second radius R1B is swept by the second sweeping surface to a point beyond the second radius R1B.

It is noted that top teardrop sweep 1123A is positioned as rotationally offset from the bottom teardrop sweep 1123B about the central axis A11. However, in other embodiments, the top teardrop sweep 1123A is rotationally aligned with the bottom teardrop sweep 1123B.

Referring to FIGS. 11B-11C, the plurality of spokes 1110 are rotationally spaced around the central hub 1108 by 90 degrees and define inter apertures 1128 between each of the plurality of spokes 1110 to reduce weight and amount of material of the wheel 1100. Of course, more or fewer spokes 1110 could be used.

With continuing reference to FIGS. 11B-11C, each spoke 1110 includes a first rib 1130' and a second rib 1130" that extend between the central hub 1108 and the rim 1112. The first rib 1130' and second rib 1130" are integrally joined at a point 1131 at the rim 1112, are arcuate shaped, and define an intra aperture 1132 between the first rib 1130', the second rib 1130", and/or the central hub 1108 to reduce the weight and material amount of the wheel 1100.

On the first side 1106A, some of the spokes 1110 (e.g., first rib 1130' and/or second rib 1130") may include a top recessed surface 1134A, but at least one of the spokes 1110 (e.g., first rib 1130' and/or second rib 1130") includes a top extended surface 1136A, where the top recessed surface 1134A and the top extended surface 1136A are perpendicular to the central axis A11. The top extended surface 1136A extends farther along the central axis A11 than the top recessed surface 1134A to provide a sweeping surface to self-clean the interior 1114 of the wheel 1100. In particular, on the first side 1106A, the first spoke 1110(1) (the first rib 1130' and second rib 1130") includes a top extended surface 1136A, and the second spoke 1110(2), third spoke 1110(3), and fourth spoke 1110(4) include a top recessed surface 1134A. It is noted that more of the spokes 1110 could include a top extended surface 1136A.

Referring to FIG. 11C, similarly, on the second side 1106B, some of the spokes 1110 (e.g., first rib 1130' and/or second rib 1130") may include a bottom recessed surface 1134B, but at least one of the spokes 1110 (e.g., first rib 1130' and/or second rib 1130") includes a bottom extended surface 1136B, where the bottom recessed surface 1134B and the bottom extended surface 1136B are perpendicular to the central axis A11. The bottom extended surface 1136B extends farther along the central axis A11 than the bottom recessed surface 1134B to provide a sweeping surface to self-clean the interior 1114 of the wheel 1100. In particular, on the second side 1106B, the second spoke 1110(2) (first rib 1130' and second rib 1130") includes a bottom extended surface 1136B, and the first spoke 1110(1), third spoke 1110(3), and fourth spoke 1110(4) include a bottom recessed surface 1134B. It is noted that more of the spokes 1110 could include a bottom extended surface 1136B.

Some of the spokes 1110 may include a top recessed surface 1134A and/or a bottom recessed surface 1134B, at least one of the spokes 1110 includes a top extended surface 1136A and/or a bottom extended surface 1136B.

Referring back to FIG. 11B, the first spoke 1110(1) includes a first rib 1130' having an inner end 1138' at a first radius R2A' and an outer end 1140' at a second radius R3A. The first radius R2A' of the inner end 1138' of the first rib 1130' is smaller than the first radius R1A of the point 1127A of the top teardrop sweep 1123A of the central hub 1108. In other words, the first radius R1A overlaps the first radius R2A', along with their associated rotational paths, to direct feed from the interior 1114 to the exterior 1116 of the wheel 1100. The inner end 1138' is rotationally offset (i.e., at a different radian from the central axis A11) from the outer end 1140'. In other words, the first rib 1130' is not aligned along a radius of the wheel 1100. As the first rib 1130' includes the top extended surface 1136A towards the first side 1106A (not a bottom extended surface 1136B towards the second side 1106B), the first rib 1130' defines a top inner sweeping surface 1142A' (may also be referred to as an inverted sweeping surface) facing toward the central axis A11, and a top outer sweeping surface 1144A' (may also be referred to as an inverted sweeping surface) facing away from the central axis A11. The first rib 1130' is arcuate shaped (i.e., has an arc), such that the first rib 1130' bows away from the central axis A11. Further, a first top transition gap 1146A' is defined between the inner end 1138' and the top extended surface 1122A of the central hub 1108 to direct feed outside the intra aperture 1132 of the spoke 1110(1) when rotated in a first direction.

Similarly, the first spoke 1110(1) includes a second rib 1130" having an inner end 1138" at a first radius R2A" and an outer end 1140" at a second radius R3A. The first radius R2A" of the inner end 1138" of the second rib 1130" is smaller than the first radius R1A of the point 1127A of the top teardrop sweep 1123A of the central hub 1108. In other words, the first radius R1A overlaps the first radius R2A", along with their associated rotational paths, to direct feed from the interior 1114 to the exterior 1116 of the wheel 1100. The inner end 1138" is rotationally offset (i.e., at a different radian from the central axis A11) from the outer end 1140". In other words, the second rib 1130" is not aligned along a radius of the wheel 1100. As the second rib 1130" includes the top extended surface 1136A towards the first side 1106A (not a bottom extended surface 1136B towards the second side 1106B), the second rib 1130" defines a top inner sweeping surface 1142A" (may also be referred to as an inverted sweeping surface) facing toward the central axis A11, and a top outer sweeping surface 1144A" (may also be referred to as an inverted sweeping surface) facing away from the central axis A11. The second rib 1130" is arcuate shaped (i.e., has an arc), such that the second rib 1130" bows away from the central axis A11. Further, a second top transition gap 1146A" is defined between the inner end 1138" and the top extended surface 1122A of the central hub 1108 to direct feed outside the intra aperture 1132 of the spoke 1110(1) when rotated in a second direction (opposite the first direction).

It is noted that the top teardrop sweep 1123A is rotationally offset from the top extended surface 1136A of the first spoke 1110(1). In other words, the point 1127A of the top teardrop sweep 1123A is rotationally offset from the point 1131 of the top extended surface 1136A of the first and second ribs 1130', 1130" of the first spoke 1110(1). As explained in more detail below, this ensures a path for grain to move from the intra aperture 1132 of the first spoke 1110(1) to the exterior 1116 of the wheel 1100.

Referring to FIG. 11C, the second spoke 1110(2) includes a first rib 1130' having an inner end 1138' at a first radius R2B' and an outer end 1140' at a second radius R3B. The first radius R2B' of the inner end 1138' of the first rib 1130' is smaller than the second radius R1B of the point 1127B of the bottom teardrop sweep 1123B of the central hub 1108. In other words, the second radius R1B overlaps the first radius R2B', along with their associated rotational paths, to direct feed from the interior 1114 to the exterior 1116 of the wheel 1100. The inner end 1138' is rotationally offset (i.e., at a different radian from the central axis A11) from the outer end 1140'. In other words, the first rib 1130' is not aligned along a radius of the wheel 1100. As the first rib 1130' includes the bottom extended surface 1136B towards the second side 1106B (not a top extended surface 1136A towards the first side 1106A), the first rib 1130' defines a bottom inner sweeping surface 1142B' (may also be referred to as an upright sweeping surface) facing toward the central axis A11, and a bottom outer sweeping surface 1144B' (may also be referred to as an upright sweeping surface) facing away from the central axis A11. The first rib 1130' is arcuate shaped (i.e., has an arc), such that the first rib 1130' bows away from the central axis A11. Further, a first bottom transition gap 1146B' is defined between the inner end 1138' and the bottom extended surface 1122B of the central hub 1108 to direct feed outside the intra aperture 1132 of the spoke 1110(1) when rotated in a first direction.

Similarly, the second spoke 1110(2) includes a second rib 1130" having an inner end 1138" at a first radius R2B" and an outer end 1140" at a second radius R3B. The first radius R2B' of the inner end 1138" of the second rib 1130" is smaller than the second radius R1B of the point 1127B of the bottom teardrop sweep 1123B of the central hub 1108. In other words, the second radius R1B overlaps the first radius R2A", along with their associated rotational paths, to direct feed from the interior 1114 to the exterior 1116 of the wheel 1100. The inner end 1138" is rotationally offset (i.e., at a different radian from the central axis A11) from the outer end 1140". In other words, the second rib 1130" is not aligned along a radius of the wheel 1100. As the second rib 1130" includes the bottom extended surface 1136B towards the second side 1106B (not a top extended surface 1136A towards the first side 1106A), the second rib 1130" defines a bottom inner sweeping surface 1142B" (may also be referred to as an upright sweeping surface) facing toward the central axis A11, and a bottom outer sweeping surface 1144B" (may also be referred to as an upright sweeping surface) facing away from the central axis A11. The second rib 1130" is arcuate shaped (i.e., has an arc), such that the second rib 1130" bows away from the central axis A11. Further, a second bottom transition gap 1146B" is defined between the inner end 1138" and the bottom extended surface 1122B of the central hub 1108 to direct feed outside the intra aperture 1132 of the spoke 1110(1) when rotated in a second direction (opposite the first direction).

It is noted that the bottom teardrop sweep 1123B is rotationally offset from the bottom extended surface 1136B of the second spoke 1110(2). In other words, the point 1127B of the bottom teardrop sweep 1123B is rotationally offset from the point 1131 of the bottom extended surface 1136B of the first and second ribs 1130', 1130" of the second spoke 1110(2). As explained in more detail below, this ensures a path for grain to move from the intra aperture 1132 of the second spoke 1110(2) to the exterior 1116 of the wheel 1100.

It is noted that although the third and fourth spokes 1110(3), 1110(4) do not include any top extended surface 1136A, all of the spokes 1110(1)-1110(4) are generally similarly shaped and may have general rotational symmetry for even rotation of the wheel 1100.

Figure 11D:
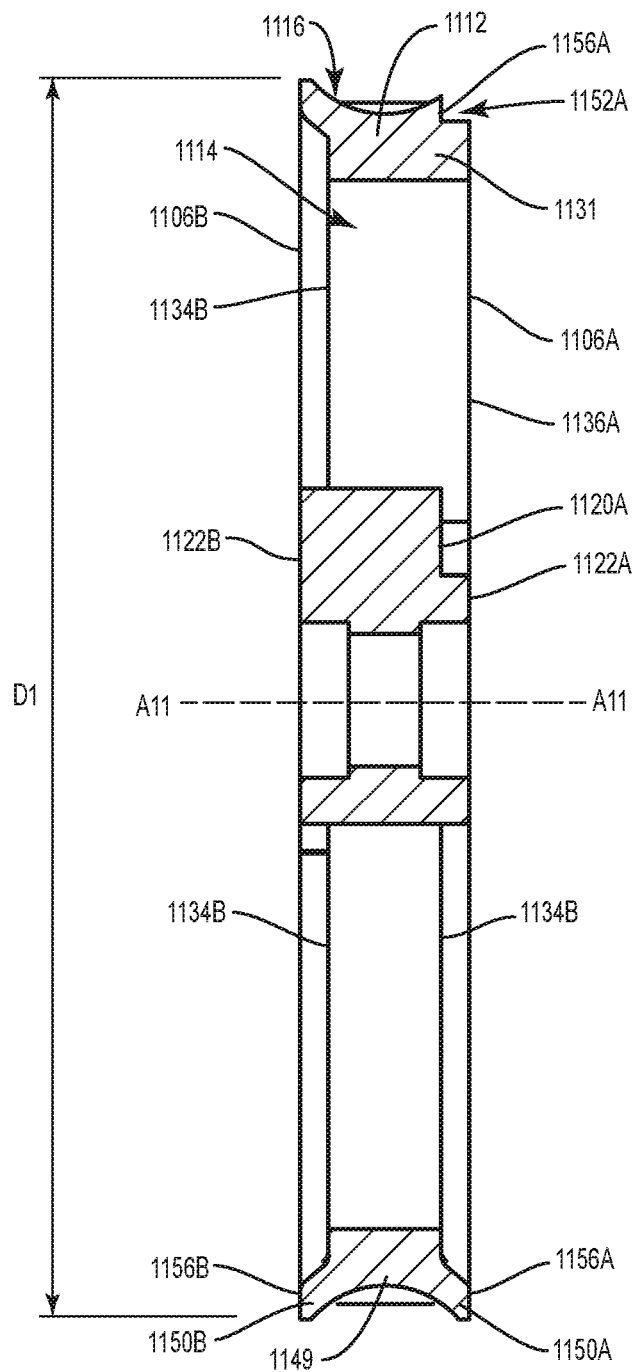
FIG. 11D is a cross-sectional side view of the wheel of the wheel assembly of FIG. 11A.

Referring to FIGS. 11B and 11D, the rim 1112 includes a sidewall 1149 and a first lip 1150A extending toward a first side 1106A. The first lip 1150A prevents feed from entering the interior 1114 of the wheel 1100. The first lip 1150A defines a top passage 1152A proximate the point 1131 of the first spoke 1110(1) to provide a path for feed to move from the interior 1114 to the exterior 1116 of the wheel 1100. In other words, the first lip 1150A defines a top extended surface 1154A, and the top passage 1152A defines a top recessed surface 1156A. The top extended surface 1154A of the rim 1112, the top extended surface 1136A of the first spoke 1110(1), and/or the top extended surface 1122A of the central hub 1108 may be generally coplanar with one another. The top recessed surface 1156A of the rim 1112, the top recessed surface 1134A of the spokes 1110, and/or the top recessed surface 1120A of the central hub 1108 may also be generally coplanar with one another.

The first lip 1150A includes a first top bevel 1157A(1) defining a first end of the top passage 1152A, and the first lip 1150A includes a second top bevel 1157A(2) defining a second end of the top passage 1152A.

Similarly, referring to FIGS. 11C and 11D, the rim 1112 includes a second lip 1150B extending toward a second side 1106B. The second lip 1150B prevents feed from entering the interior 1114 of the wheel 1100. The second lip 1150B defines a bottom passage 1152B proximate the point 1131 of the second spoke 1110(2) to provide a path for feed to move from the interior 1114 to the exterior 1116 of the wheel 1100. In other words, the second lip 1150B defines a bottom extended surface 1154B and the bottom passage 1152B defines a bottom recessed surface 1156B. The bottom extended surface 1154B of the rim 1112, the bottom extended surface 1136B of the second spoke 1110(2), and/or the bottom extended surface 1122B of the central hub 1108 may be generally coplanar with one another. The bottom recessed surface 1156B of the rim 1112, the bottom recessed surface 1134B of the spokes 1110, and/or the bottom recessed surface 1120B of the central hub 1108 may also be generally coplanar with one another.

The second lip 1150B includes a first bottom bevel 1157B(1) defining a first end of the bottom passage 1152B, and the second lip 1150B includes a second bottom bevel 1157B(2) defining a second end of the bottom passage 1152B.

The bevels 1157A(1), 1157A(2), 1157B(1), 1157B(2) (may be referred to generally as bevels 1157) increase the efficiency of removing feed from the interior 1114 to the exterior 1116 of the wheel 1100. Although in certain embodiments, the bevels 1157 are omitted. In certain embodiments, the wheel 1100 has a diameter D1 of 10.975 in. and the top passage 1152A and/or the bottom passage 1152B have a first width W1 (excluding the bevels 1157) between 2 and 4 in. (e.g., between 2.5 and 3.5 in., etc.), and a second width W2 (including the bevels 1157) between 3 and 5.5 in. (e.g., between 3.5 and 5 in., between 4 and 4.5 in., etc.). In particular, in certain embodiments, the wheel 1100 has a diameter D1 of 10.975 in. and the top passage 1152A and/or the bottom passage 1152B have a first width W1 of 3 in. (excluding the bevels 1157) and a second width W2 of 4.336 (including the bevels 1157). The widths W1, W2 of the top and bottom passages 1152A, 1152B are dimensioned to increase the efficiency of removing feed from the interior 1114 to the exterior 1116 of the wheel 1100.

Figure 12A:
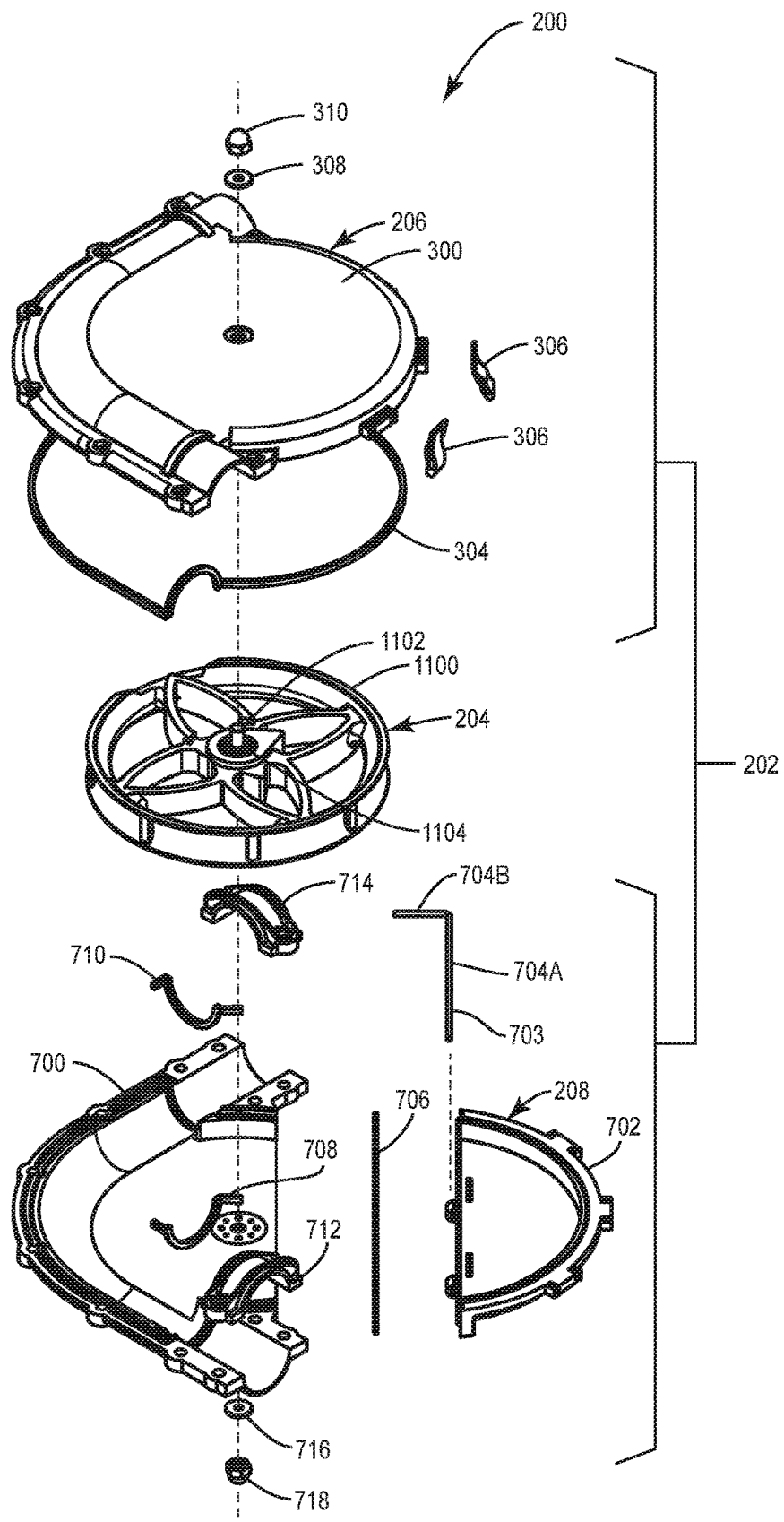
FIG. 12A is an exploded top perspective view of the chain disk corner of FIGS. 2A-2C illustrating assembly of the chain disk corner.
Figure 12B:
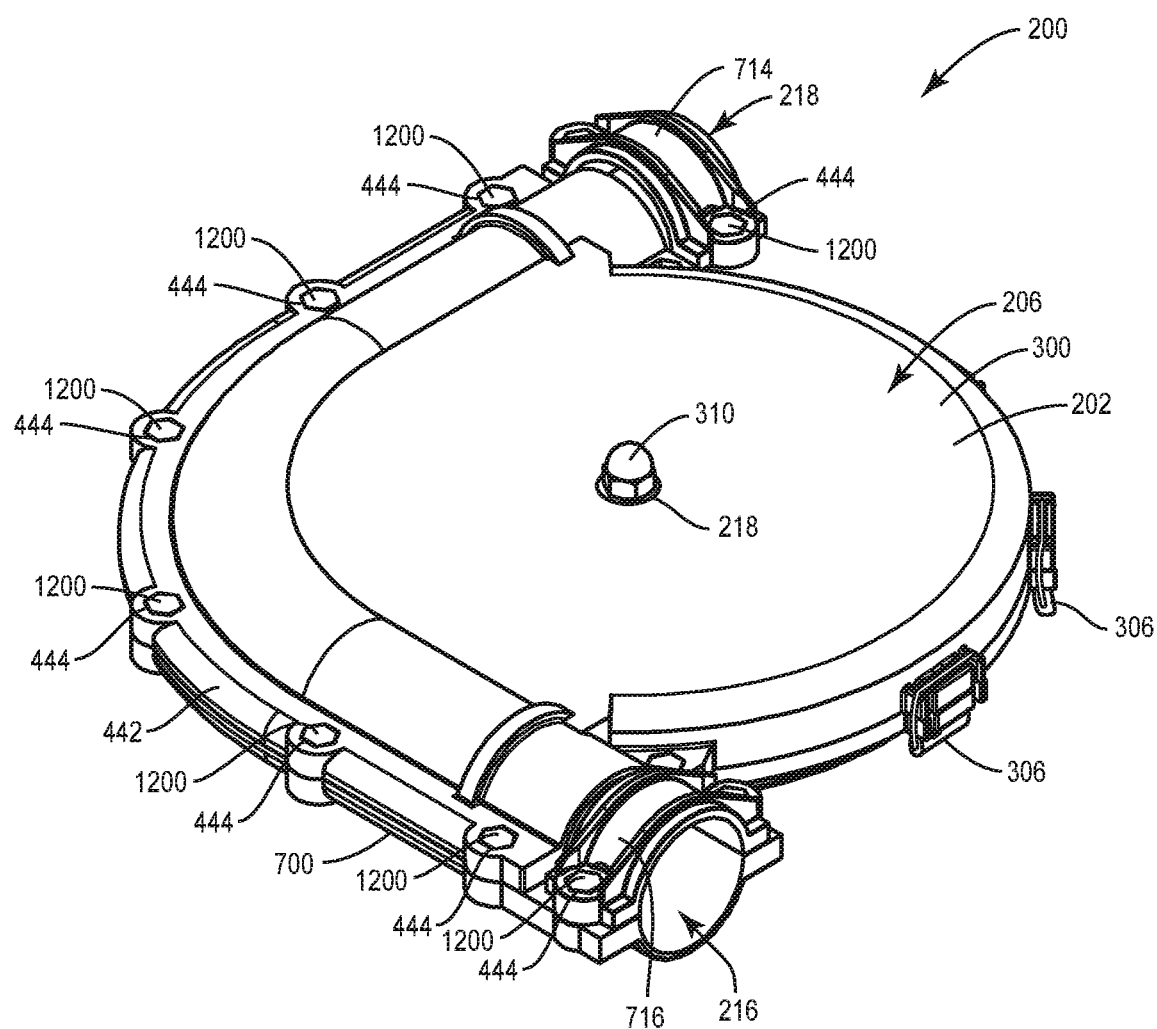
FIG. 12B is a top perspective assembled view of the chain disk corner of FIG. 12A.
Figure 12C:
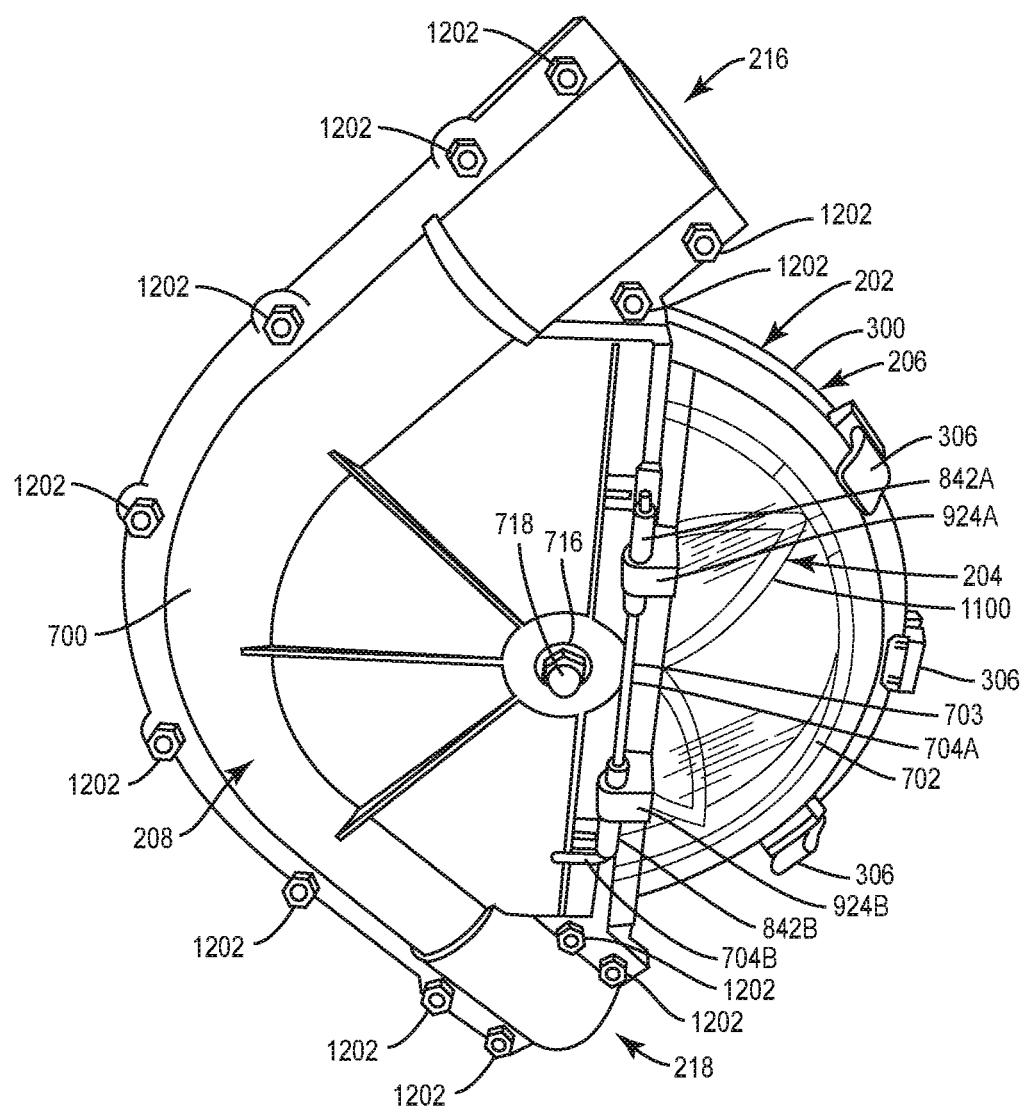
FIG. 12C is a bottom perspective view of the chain disk corner of FIG. 12A with the window in a closed position.

FIGS. 12B and 12C are views illustrating assembly of the chain disk corner 200, and of the chain disk corner 200 once assembled. FIG. 12A is an exploded top perspective view of the chain disk corner 102 of FIGS. 2A-2C illustrating assembly of the chain disk corner 102, FIG. 12B is a top perspective assembled view of the chain disk corner 200 of FIG. 12A, and FIG. 12C is a bottom perspective view of the chain disk corner 200 of FIG. 12A with the window 702 in a closed position.

In assembling the chain disk corner 102, the bottom body 700 of the housing bottom subassembly 208 is pivotably attached to the window 702 by aligning the bores 850A, 852A (see FIG. 8E) of the first hinge connector 842A of the bottom body 700 and the bores 850B, 852B (see FIG. 8E) of the second hinge connector 842B of the bottom body 700 with the first bore 926A (see FIGS. 9B-9D) of the first hinge connector 924A of the window 702 and the second bore 926B (see FIGS. 9B-9D) of the second hinge connector 924B of the window 702, and inserting the long leg 704A of the L-shaped rod 703 therethrough. The wheel assembly 204 is then positioned in the bottom housing subassembly 208, the threaded axle 1102 of the wheel assembly 204 is inserted through the bottom center hole 814 of the bottom body 700, and the bottom washer 716 and the bottom nut 718 are attached to a bottom end of the threaded axle 1102. It is noted that the orientation of the wheel 1100 of the wheel assembly 204 does not matter. The wheel 1100 is orientation independent and can operate and self-clean regardless of whether the first side 1106A or the second side 1106B of the wheel 1100 is proximate the interior surface 802 of the bottom body 700. Further, the wheel 1100 is direction independent and can operate and self-clean regardless of whether the wheel 1100 is rotated in a clockwise or counter-clockwise direction.

The housing top subassembly 206 is then positioned over the housing bottom subassembly 208, thereby containing the wheel 1100 of the wheel assembly 204 within the housing 202 formed by the housing top subassembly 206 and the housing bottom subassembly 208. The threaded axle 1102 of the wheel assembly 204 is inserted through the top center hole 412 of the top body 300, and the top washer 308 and the top nut 310 are attached to a top end of the threaded axle 1102.

The counter bore hex holes 444 in the peripheral edge 442 of the top body 300 are aligned with the holes 834 in the bottom body 700 and hex bolts 1200 are positioned therethrough. As noted above, the counter bore hex holes 444 in the top body 300 are counter-bored to receive and rotationally retain the hex bolts 1200 for ease of assembly as the nuts 1202 are attached to the hex bolts 1200. The plurality of retainer clips 306 of the housing top subassembly 206 releasably attach the top body 300 to the window 702 for tool-less entry, as explained in more detail below. The housing gasket 304 of the housing top subassembly 206 is compressed between the top body 300, the bottom body 700, and the window 702. The footprint formed by the top body 300 is generally complementary to the footprint formed by the combination of the bottom body 700 and the window 702.

A tube may be inserted into the first opening 216 and the second opening 218 before or after the top body 300 is attached to the bottom body 700 and the window 702. After the tubes are positioned in the first opening 216 and the second opening 218, the first channel clamp 712 and the second channel clamp 714 are positioned on the tubes and attached to the bottom body 700.

Referring to FIG. 12C, a user can view operation of the wheel 1100 within the housing 202 through the window 702. Further, by having only a portion of the housing 202 transparent, the chain disk corner 200 is utilizes the stronger and more robust opaque materials.

It is noted that the L-shaped rod 703 may be inserted through the bores 850A, 852A, the bores 850B, 852B, the first bore 926A, and the second bore 926B from either direction. In either case, long leg 704A of the L-shaped rod 703 is rotated and the short leg 704B of the L-shaped rod 703 is positioned in and retained either in the recess 856A of the retainer structure 854A of the first hinge connector 842A of the bottom body 700 or in the recess 856B of the retainer structure 854B of the second hinge connector 842B of the bottom body 700.

Figure 12D:
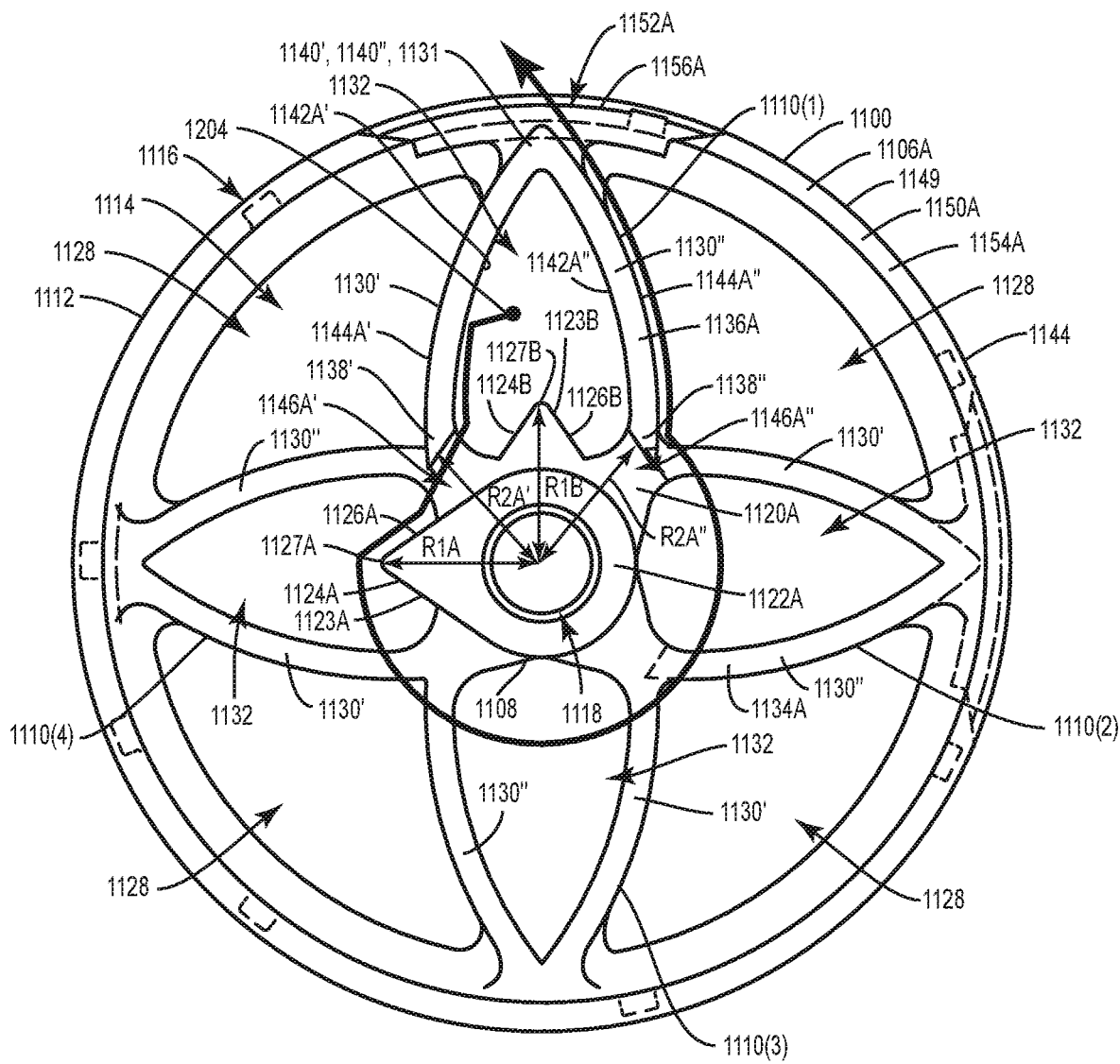
FIG. 12D is a top view of the wheel of the wheel assembly of FIG. 12A illustrating movement of a feed grain from an interior to an exterior of the wheel when the wheel is rotated in a clockwise direction.
Figure 12E:
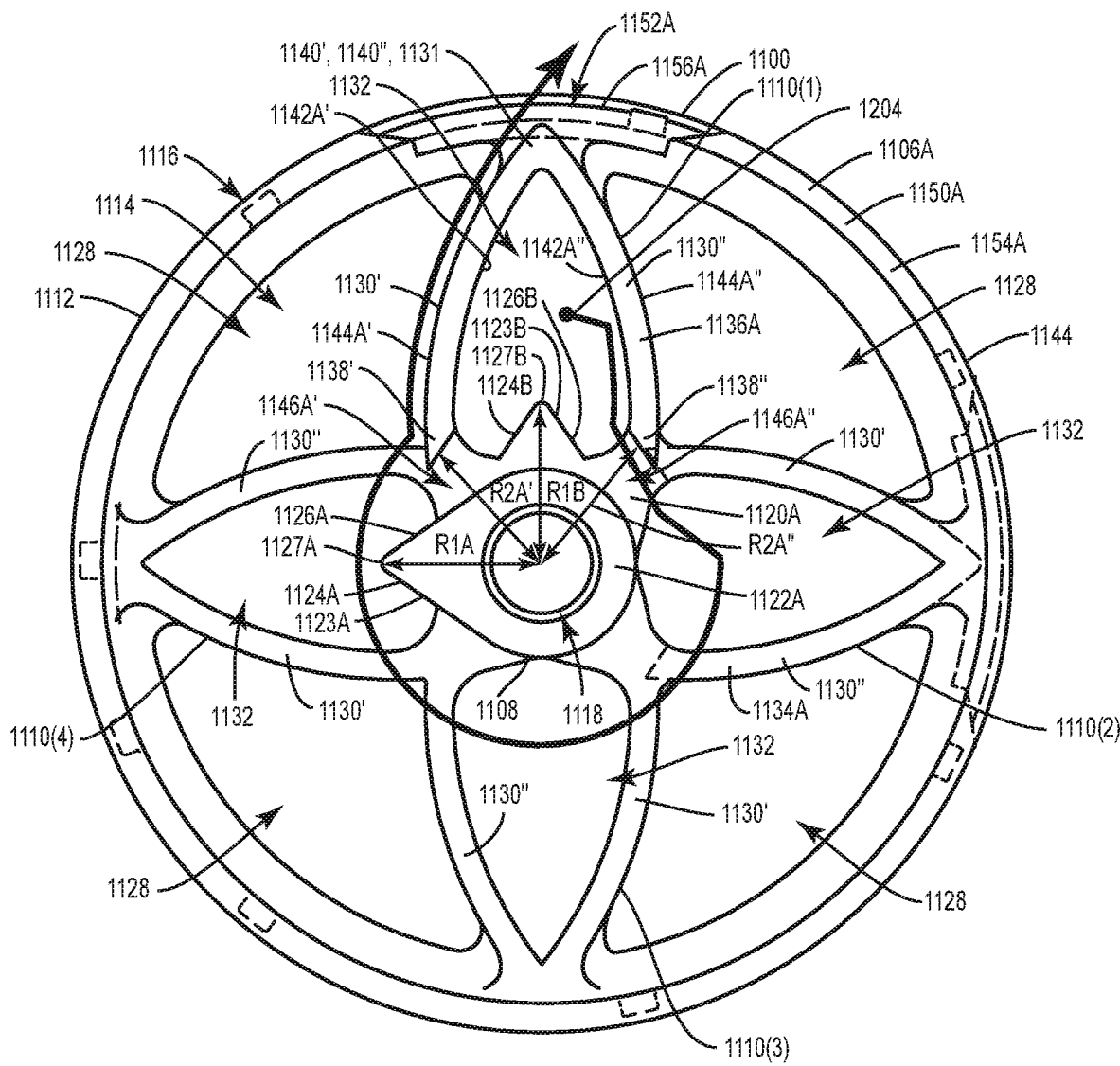
FIG. 12E is a top view of the wheel of the wheel assembly of FIG. 12A illustrating movement of a feed grain from the interior to the exterior of the wheel when the wheel is rotated in a counter-clockwise direction.

FIGS. 12D-12E are views illustrating self-cleaning of the wheel 1100 when the wheel 1100 is in an inverted orientation within the chain disk corner housing 202. FIG. 12D is a top view of the wheel 1100 of FIG. 12A illustrating movement of a feed grain 1204 from an interior 1114 to an exterior 1116 of the wheel 1100 when the wheel 1100 is rotated in a clockwise direction (from the perspective of the top of the wheel 1100). In particular, the grain 1204 is initially positioned within the intra aperture 1132 of the first spoke 1110(1), and as the wheel 1100 rotates in a clockwise direction, the grain 1204 contacts the top inner sweeping surface 1142A' of the first rib 1130'. As noted above, the first rib 1130' is not aligned along a radius of the wheel 1100. Accordingly, this angled orientation and the arcuate surface, directs the grain 1204 towards the inner end 1138' of the first rib 1130', until the grain 1204 moves beyond the inner end 1138' at the first radius R2A'. The second top sweeping surface 1126A then contacts the grain 1204. As similarly noted above, the angled orientation directs the grain 1204 outward beyond the first radius R1A (which is greater than the first radius R2A'). The grain 1204 moves underneath the top recessed surface 1134A of the other spokes 1110(2)-1110(4) and then contacts the top outer sweeping surface 1144A" of the second rib 1130". As similarly noted above, the angled orientation and arcuate surface directs the grain 1204 outward beyond the point 1131 and through the top passage 1152A of the rim 1112.

FIG. 12E is a top view of the wheel 1100 of FIG. 12A illustrating movement of a feed grain 1204 from the interior 1114 to the exterior 1116 of the wheel 1100 when the wheel 1100 is rotated in a counter-clockwise direction (from the perspective of the top of the wheel 1100). In particular, the grain 1204 is initially positioned within the intra aperture 1132 of the first spoke 1110(1), and as the wheel 1100 rotates in a counter-clockwise direction, the grain 1204 contacts the top inner sweeping surface 1142A" of the second rib 1130". As noted above, the second rib 1130" is not aligned along a radius of the wheel 1100. Accordingly, this angled orientation and the arcuate surface, directs the grain 1204 towards the inner end 1138" of the second rib 1130", until the grain 1204 moves beyond the inner end 1138" at the first radius R2A". The first top sweeping surface 1124A then contacts the grain 1204. As similarly noted above, the angled orientation directs the grain 1204 outward beyond the first radius R1A (which is greater than the first radius R2A"). The grain 1204 moves underneath the top recessed surface 1134A of the other spokes 1110(2)-1110(4) and then contacts the top outer sweeping surface 1144A' of the first rib 1130'. As similarly noted above, the angled orientation and arcuate surface directs the grain 1204 outward beyond the point 1131 and through the top passage 1152A of the rim 1112.

It is noted that a similar self-cleaning path is formed on the second side 1106B when the wheel 1100 is flipped within the housing 202.

Figure 12F:
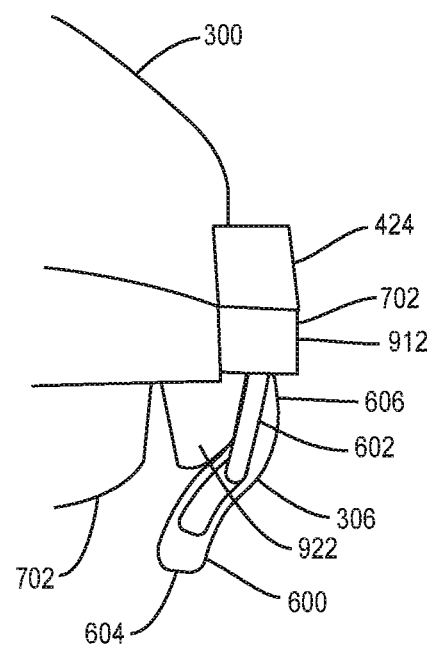
FIG. 12F is a side view of the chain disk corner of FIG. 12A with the retainer clip in a closed position.

FIG. 12F is a side view of the chain disk corner 200 of FIG. 12A with the retainer clip 306 in a closed position. In particular, the insertion end 606 of the lever 600 is positioned within the horizontal groove 916 of the retainer clip receptacle 912 of the window 702. The lever 600 rests against the lever stop 922 of the window 702.

Figure 12G:
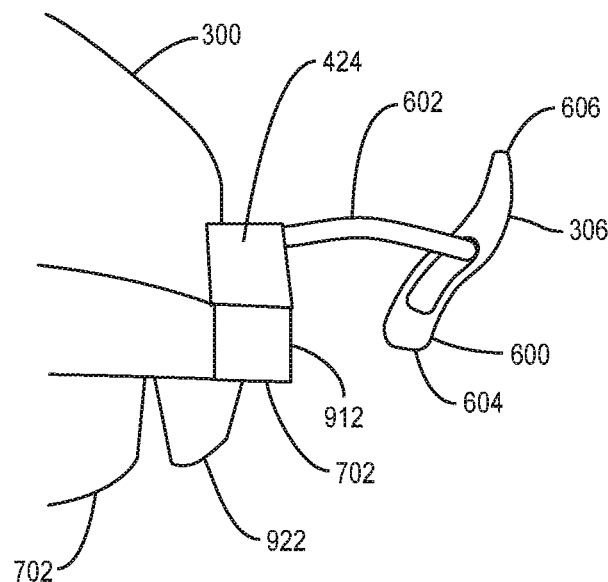
FIG. 12G is a side view of the chain disk corner of FIG. 12A with the retainer clip in an open position.

FIG. 12G is a side view of the chain disk corner 200 of FIG. 12A with the retainer clip 306 in an open position. To move the retainer clip 306, a user puts their finger underneath the retainer clip 306, and pulls the grip end 604 of the lever outward toward the user. Doing so rotates the lever 600, and also rotates the wire 602 within the horizontal groove 428 of the retainer clip mount 424, until the lever 600 disengages. Continued rotation of the wire 602 moves the lever 600 further out of the way of the window 702.

Figure 12H:
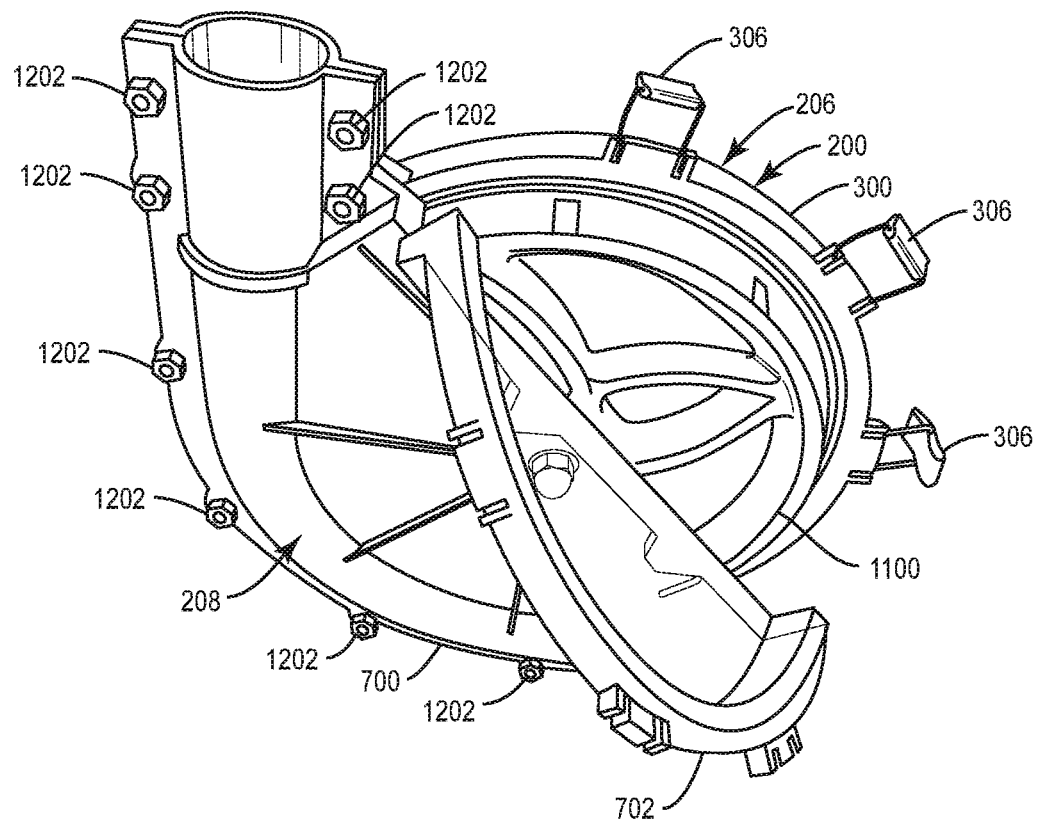
FIG. 12H is a bottom perspective view of the chain disk corner of FIG. 12A with the window in an open position.

FIG. 12H is a bottom perspective view of the chain disk corner 200 of FIG. 12A with the window 702 in an open position. In particular, with the retainer clips 306 disengaged, the window 702 can pivot relative to the bottom body 700 to provide access to the interior 210 of the housing 202, even during operation and rotation of the wheel 1100 within the housing 202.

It will be apparent to those skilled in the art that various modifications and variations can be made without departing from the spirit or scope of the invention.

Many modifications and other embodiments of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A wheel for a chain disk corner, comprising:
a central hub extending along a center axis, the central hub defining a central hole to receive an axle therethrough to rotatably mount the wheel within the chain disk corner;
a rim having a circular sidewall to route a disk chain through the chain disk corner, the circular sidewall having a top edge and a bottom edge opposite the top edge, a portion of the bottom edge recessed to define at least one bottom passage in the circular sidewall; and
a plurality of spokes circumferentially positioned around the central hub, each of the plurality of spokes having an inner end connected to the central hub and an outer end connected to the rim;
wherein at least one of the plurality of spokes defines a first upright sweeping surface and a second upright sweeping surface opposite the first upright sweeping surface, the first upright sweeping surface and the second upright sweeping surface configured to contact material accumulated within the wheel at a bottom inner surface of the chain disk corner when the wheel is in an upright configuration;
wherein the first upright sweeping surface is configured to direct the material through the at least one bottom passage outside the wheel as the wheel rotates in a clockwise direction; and
wherein the second upright sweeping surface is configured to direct the material through the at least one bottom passage outside the wheel as the wheel rotates in a counter-clockwise direction.

2. The wheel of claim 1,
wherein the central hub comprises a third upright sweeping surface and a fourth upright sweeping surface opposite the third upright sweeping surface, the third upright sweeping surface and the fourth upright sweeping surface configured to contact the material accumulated within the wheel at the bottom inner surface of the chain disk corner when the wheel is in the upright configuration;
at least a portion of the third upright sweeping surface and the fourth upright sweeping surface radially extending to overlap with a sweeping path of the first upright sweeping surface and the second upright sweeping surface;
wherein the third upright sweeping surface is configured to direct the material into the sweeping path of the first upright sweeping surface as the wheel rotates in the clockwise direction; and
wherein the fourth upright sweeping surface is configured to direct the material into the sweeping path of the second upright sweeping surface as the wheel rotates in the counter-clockwise direction.

3. The wheel of claim 1, wherein a portion of the top edge is recessed to define at least one top passage in the circular sidewall.

4. The wheel of claim 3,
wherein at least one of the plurality of spokes defines a first inverted sweeping surface and a second inverted sweeping surface opposite the first inverted sweeping surface, the first inverted sweeping surface and the second inverted sweeping surface configured to contact the material accumulated within the wheel at the bottom inner surface of the chain disk corner when the wheel is in an inverted configuration such that the top edge is positioned proximate the bottom inner surface;
wherein the first inverted sweeping surface is configured to direct the material through the at least one top passage outside the wheel as the wheel rotates in the clockwise direction; and
wherein the second inverted sweeping surface is configured to direct the material through the at least one top passage outside the wheel as the wheel rotates in the counter-clockwise direction.

5. The wheel of claim 4,
wherein the central hub comprises a third upright sweeping surface and a fourth upright sweeping surface opposite the third upright sweeping surface, the third upright sweeping surface and the fourth upright sweeping surface configured to contact the material accumulated within the wheel at the bottom inner surface of the chain disk corner when the wheel is in the upright configuration;
at least a portion of the third upright sweeping surface and the fourth upright sweeping surface radially extending to overlap with a sweeping path of the first upright sweeping surface and the second upright sweeping surface;
wherein the third upright sweeping surface is configured to direct the material into the sweeping path of the first upright sweeping surface as the wheel rotates in the clockwise direction; and
wherein the fourth upright sweeping surface is configured to direct the material into the sweeping path of the second upright sweeping surface as the wheel rotates in the counter-clockwise direction.

6. The wheel of claim 5,
wherein the central hub comprises a third inverted sweeping surface and a fourth inverted sweeping surface opposite the third inverted sweeping surface, the third inverted sweeping surface and the fourth inverted sweeping surface configured to contact the material accumulated within the wheel at the bottom inner surface of the chain disk corner when the wheel is in the inverted configuration;
at least a portion of the third inverted sweeping surface and the fourth inverted sweeping surface radially extending to overlap with a sweeping path of the first inverted sweeping surface and the second inverted sweeping surface;
wherein the third inverted sweeping surface is configured to direct the material into the sweeping path of the first inverted sweeping surface as the wheel rotates in the clockwise direction; and
wherein the fourth inverted sweeping surface is configured to direct the material into the sweeping path of the second inverted sweeping surface as the wheel rotates in the counter-clockwise direction.

7. The wheel of claim 1, wherein the central hub forms a teardrop sweep with a first point, the teardrop sweep defining a third upright sweeping surface and a fourth upright sweeping surface opposite the third upright sweeping surface, the third upright sweeping surface and the fourth upright sweeping surface configured to contact the material accumulated within the wheel at the bottom inner surface of the chain disk corner when the wheel is in the upright configuration.

8. The wheel of claim 1, wherein at least one of the plurality of spokes comprises a first rib and a second rib integrally extending from the central hub and integrally connected to one another to form a point proximate the at least one bottom passage, the first rib and the second rib unaligned with a radius of the wheel.

9. The wheel of claim 8,
wherein the at least one bottom passage comprises a single bottom passage; and
wherein a first point formed by the first rib and the second rib is aligned with a middle of the single bottom passage.

10. The wheel of claim 9, wherein a first outer surface of the first rib defines the first upright sweeping surface and a second outer surface of the second rib defines the second upright sweeping surface.

11. The wheel of claim 10,
wherein a first inner surface of the first rib defines a third upright sweeping surface and a second inner surface of the second rib defines a fourth upright sweeping surface;
wherein the third upright sweeping surface is configured to direct the material out of an intra aperture defined between the first rib and the second rib when the wheel is in the upright configuration as the wheel rotates in the clockwise direction; and
wherein the fourth upright sweeping surface is configured to direct the material out of the intra aperture when the wheel is in the upright configuration as the wheel rotates in the counter-clockwise direction.

12. The wheel of claim 11,
wherein the central hub forms a teardrop sweep with a second point, the teardrop sweep defining a fifth upright sweeping surface and a sixth upright sweeping surface opposite the fifth upright sweeping surface, the fifth upright sweeping surface and the sixth upright sweeping surface configured to contact the material accumulated within the wheel at the bottom inner surface of the chain disk corner when the wheel is in the upright configuration;
wherein the fifth upright sweeping surface is configured to direct the material into a sweeping path of the first upright sweeping surface as the wheel rotates in the clockwise direction; and
wherein the sixth upright sweeping surface is configured to direct the material into a sweeping path of the second upright sweeping surface as the wheel rotates in the counter-clockwise direction.

13. The wheel of claim 12, wherein the second point is rotationally offset from the first point about a central axis of the wheel.

14. The wheel of claim 12, wherein the second point is rotationally offset from the first point by at least 90 degrees.

15. The wheel of claim 12,
wherein the inner end of the first rib is at a first radius;
wherein the second point of the teardrop sweep of the central hub is at a second radius; and
wherein the first radius is smaller than the second radius.

16. A wheel for a chain disk corner, comprising:
a central hub extending along a center axis, the central hub defining a central hole to receive an axle therethrough to rotatably mount the wheel to the chain disk corner;
a rim having a circular sidewall to route a disk chain through the chain disk corner; and
a plurality of spokes circumferentially positioned around the central hub, each of the plurality of spokes having a proximal end connected to the central hub and a second end connected to the rim;
wherein the wheel is devoid of moving parts; and
wherein the wheel is configured for bi-directional radial self-cleaning by rotation around a central axis of the wheel.

17. The wheel of claim 16, wherein the wheel is configured for orientation independent self-cleaning comprising bi-direction self-cleaning by rotation around the central axis when the wheel is in an upright orientation, and bi-directional self-cleaning by rotation around the central axis when the wheel is in an inverted orientation.

18. The wheel of claim 17, wherein a bottom lip of the wheel defines at least one first passage for self-cleaning in the upright orientation.

19. The wheel of claim 17, wherein a top lip of the wheel defines at least one second passage for self-cleaning in the inverted orientation.

20. The wheel of claim 17,
wherein at least one of the plurality of spokes define an intra aperture; and
wherein the wheel is configured to direct material from the intra aperture to an exterior of the wheel as the wheel rotates around the central axis.

21. A chain disk corner, comprising:
a chain disk corner housing comprising:
  a first body comprising a first wheel portion and a first channel proximate the first wheel portion, the first body comprising a first material, the first wheel portion defining a first center hole;
  a second body attached to the first body, the second body comprising a second wheel portion and a second channel proximate the second wheel portion, the second body comprising the first material, the first channel and the second channel together defining an angled channel for routing a disk chain therethrough; and
  a first washer non-rotatably attached to a first inner surface of the first wheel portion about the first center hole, the first washer comprising a second material having greater strength and rigidity than the first material, the first washer configured to increase a strength and rigidity around the first center hole; and
a wheel rotatably mounted and positioned within the first wheel portion and the second wheel portion to route the disk chain through the angled channel.

22. The chain disk corner of claim 21, wherein the first washer comprises a center hole and at least one peripheral hole offset from the center hole.

23. The chain disk corner of claim 22, wherein the first body integrally extends from the first inner surface of the first body into at least a portion of the at least one peripheral hole of the first washer.

24. The chain disk corner of claim 21, wherein the first material comprises a non-metal material.

25. The chain disk corner of claim 21, wherein the second material comprises a non-metal material.

26. The chain disk corner of claim 21, wherein the first washer comprises a center hole and a plurality of peripheral holes offset from and positioned around the center hole.

27. The chain disk corner of claim 26, wherein an inner surface of the first body defines a seat, and a first reinforcing washer is positioned within the seat.

28. The chain disk corner of claim 27, wherein the first reinforcing washer is insert-molded with the second body.

29. The chain disk corner of claim 21,
wherein the second wheel portion defines a second center hole, an axle positioned within and extending through the second center hole; and
further comprising a second washer non-rotatably attached to a second inner surface of the second wheel portion about the second center hole, the second washer comprising the second material, the second washer configured to increase a strength and rigidity around the second center hole.

30. The chain disk corner of claim 21, wherein the first wheel portion comprises a top surface devoid of pockets to prevent material accumulation on the top surface.

31. The chain disk corner of claim 21, wherein an interior surface of the first wheel portion comprises a first plurality of ribs.

32. The chain disk corner of claim 31, wherein a top surface of the first wheel portion is devoid of ribs.

33. The chain disk corner of claim 21, wherein a bottom surface of the second wheel portion comprises a second plurality of ribs.

34. The chain disk corner of claim 21,
wherein the first body comprises a top body and the second body comprises a bottom body;
further comprising a window attached to the bottom body, the window comprising a translucent material to provide visual access to an interior of the chain disk corner housing; and
wherein the first wheel portion of the top body is complementary in size and shape to a combination of (i) the second wheel portion of the bottom body and (ii) the window.

35. The chain disk corner of claim 34, wherein an opaque material of the bottom body has greater strength and rigidity than a translucent material of the window.

36. The chain disk corner of claim 35, wherein a strength and rigidity of the opaque material is greater than a strength and rigidity of the translucent material.

37. The chain disk corner of claim 34, wherein the window is selectively movable between a closed position and an open position during, and without interrupting, operation of the chain disk corner.

38. The chain disk corner of claim 37, further comprising a retainer clip to selectively retain the window in the closed position, wherein the retainer clip is moveable between a locked state and an unlocked state to provide tool-less entry to an interior of the chain disk corner housing.

39. The chain disk corner of claim 21, wherein the wheel is self-cleaning and devoid of moving parts.

40. The chain disk corner of claim 39, wherein the self-cleaning of the wheel is orientation independent and rotation independent.

* * * * *